US011925908B2

(12) United States Patent
Shimazu et al.

(10) Patent No.: US 11,925,908 B2
(45) Date of Patent: Mar. 12, 2024

(54) FINE BUBBLE GENERATOR

(71) Applicant: RINNAI CORPORATION, Nagoya (JP)

(72) Inventors: Tomoyuki Shimazu, Nagoya (JP); Kunio Kataoka, Nagoya (JP)

(73) Assignee: RINNAI CORPORATION, Nagoya (JP)

( * ) Notice: Subject to any disclaimer, the term of this patent is extended or adjusted under 35 U.S.C. 154(b) by 0 days.

(21) Appl. No.: 17/805,514

(22) Filed: Jun. 6, 2022

(65) Prior Publication Data

US 2022/0387945 A1 Dec. 8, 2022

(30) Foreign Application Priority Data

Jun. 7, 2021 (JP) .................................. 2021-095328

(51) Int. Cl.
*B01F 3/04* (2006.01)
*B01F 23/232* (2022.01)
(Continued)

(52) U.S. Cl.
CPC ........ *B01F 23/232* (2022.01); *B01F 23/2373* (2022.01); *B01F 25/103* (2022.01);
(Continued)

(58) Field of Classification Search
CPC .. B01F 23/232; B01F 23/2373; B01F 25/103; B01F 25/4323; B01F 25/4335; B01F 2025/913; B01F 2025/916
(Continued)

(56) References Cited

U.S. PATENT DOCUMENTS

| 4,370,304 A | * | 1/1983 | Hendriks | ................ C01B 25/28 |
| | | | | 423/310 |
| 6,969,052 B2 | * | 11/2005 | Korzeniowski | ..... B01F 25/3121 |
| | | | | 261/76 |

(Continued)

FOREIGN PATENT DOCUMENTS

| CN | 111821871 A | | 10/2020 | |
| CN | 115555913 A | * | 1/2023 | ...... B01F 25/312522 |

(Continued)

OTHER PUBLICATIONS

English Translation of KR 102215787 B1 (Year: 2021).*
English Translation of KR 20210148481 A (Year: 2021).*
English Translation of CN 115555913 A (Year: 2023).*

*Primary Examiner* — Charles S Bushey
(74) *Attorney, Agent, or Firm* — K&L Gates LLP

(57) ABSTRACT

A fine bubble generator may include an inlet; an outlet; a first fine bubble generation portion; and a second fine bubble generation portion. The first fine bubble generation portion includes: a diameter-reducing flow path and a diameter-increasing flow path. The second fine bubble generation portion includes: a first swirling flow generation portion; and a second swirling flow generation portion. The first swirling flow generation portion includes: a first outer peripheral portion; and a plurality of first vanes disposed configured to generate a first swirling flow flowing in a first swirling direction with respect to a center axis of the second fine bubble generation portion. The second swirling flow generation portion includes: a second outer peripheral portion; and a plurality of second vanes configured to generate a second swirling flow flowing in a second swirling direction opposite to the first swirling direction with respect to the center axis.

10 Claims, 11 Drawing Sheets

(51) Int. Cl.
  *B01F 23/2373* (2022.01)
  *B01F 25/10* (2022.01)
  *B01F 25/432* (2022.01)
  *B01F 25/433* (2022.01)
  *B01F 25/00* (2022.01)

(52) U.S. Cl.
  CPC ...... *B01F 25/4323* (2022.01); *B01F 25/4335* (2022.01); *B01F 2025/913* (2022.01); *B01F 2025/916* (2022.01)

(58) Field of Classification Search
  USPC .................................................... 261/79.2
  See application file for complete search history.

(56) References Cited

U.S. PATENT DOCUMENTS

| | | | |
|---|---|---|---|
| 10,695,726 | B2 | 6/2020 | Tian |
| 11,077,411 | B2 | 8/2021 | Shibata et al. |
| 11,331,910 | B2 | 5/2022 | Arimizu et al. |
| 2007/0205523 | A1* | 9/2007 | Kojima ............... B01F 25/4312 261/79.2 |
| 2017/0304782 | A1* | 10/2017 | Wu .................... B01F 25/31242 |
| 2018/0023600 | A1 | 1/2018 | Komazawa et al. |
| 2019/0176100 | A1 | 6/2019 | Shibata et al. |
| 2021/0331124 | A1 | 10/2021 | Shibata et al. |
| 2022/0387945 | A1 | 12/2022 | Shimazu |
| 2022/0387946 | A1* | 12/2022 | Shimazu ............. B01F 25/4323 |
| 2023/0009590 | A1* | 1/2023 | Shimazu ............. B01F 25/4335 |

FOREIGN PATENT DOCUMENTS

| | | | | |
|---|---|---|---|---|
| JP | 2002263678 | A | 9/2002 | |
| JP | 2008018330 | A | 1/2008 | |
| JP | 6048841 | B2 | 12/2016 | |
| JP | 6077627 | B1 | 1/2017 | |
| JP | 2018008193 | A | 1/2018 | |
| JP | 2019166493 | A | 10/2019 | |
| KR | 10-2215787 | * | 2/2021 | ........ B01F 23/23126 |
| KR | 10-2021-0148481 | * | 12/2021 | .......... B01F 23/3121 |
| WO | 2014084301 | A1 | 6/2014 | |

* cited by examiner

Upstream Side ←——→ Downstream Side

Upstream Side ←——→ Downstream Side

FINE BUBBLE GENERATOR

CROSS-REFERENCE TO RELATED APPLICATION

This application claims priority to Japanese Patent Application No. 2021-095328 filed on Jun. 7, 2021, the contents of which are hereby incorporated by reference into the present application.

TECHNICAL FIELD

The art disclosed herein relates to a fine bubble generator.

BACKGROUND ART

Japanese Patent Application Publication No. 2018-8193 describes a fine bubble generator that includes an inlet into which gas-dissolved water in which gas is dissolved flows, an outlet out of which the gas-dissolved water flows, and a fine bubble generation portion disposed between the inlet and the outlet. The fine bubble generation portion includes a diameter-reducing flow path of which flow path diameter reduces from upstream to downstream, and a diameter-increasing flow path disposed downstream than the diameter-reducing flow path and having a flow path diameter that increases from upstream to downstream.

SUMMARY

In the fine bubble generator of JP 2018-8193 A, the water in which gas is dissolved (which may hereinbelow termed "gas-dissolved water") flows into the diameter-reducing flow path in the fine bubble generation portion via the inlet. A flow speed of the gas-dissolved water increases as it flows through the diameter-reducing flow path, as a result of which its pressure is reduced. Bubbles are generated as a result of this pressure reduction of the gas-dissolved water. Then, the pressure of the gas-dissolved water is gradually increased as the gas-dissolved water flows through the diameter-increasing flow path. When the pressure of the gas-dissolved water is increased after the bubbles were generated by the pressure reduction, the bubbles included in the gas-dissolved water break up into fine bubbles. As above, in the fine bubble generator, the fine bubbles are generated by the fine bubble generation portion. However, in the above fine bubble generator, a situation may occur in which the fine bubbles generated by the fine bubble generator is insufficient in volume.

The description herein provides an art configured to generate fine bubbles in large volume.

A fine bubble generator disclosed herein may comprise: an inlet into which gas-dissolved water in which gas is dissolved flows; an outlet out of which the gas-dissolved water flows; a first fine bubble generation portion disposed between the inlet and the outlet; and a second fine bubble generation portion disposed between the first fine bubble generation portion and the outlet, wherein the first fine bubble generation portion comprises: a diameter-reducing flow path, wherein a flow path diameter of the diameter-reducing flow path reduces from upstream to downstream, and a diameter-increasing flow path disposed downstream than the diameter-reducing flow path, wherein the flow path diameter of the diameter-increasing flow path increases from upstream to downstream, the second fine bubble generation portion comprises: a first swirling flow generation portion; and a second swirling flow generation portion disposed downstream of the first swirling flow generation portion, the first swirling flow generation portion comprises: a first outer peripheral portion; and a plurality of first vanes disposed inside the first outer peripheral portion and configured to generate a first swirling flow flowing in a first swirling direction with respect to a center axis of the second fine bubble generation portion, and the second swirling flow generation portion comprises: a second outer peripheral portion; and a plurality of second vanes disposed inside the second outer peripheral portion and configured to generate a second swirling flow flowing in a second swirling direction opposite to the first swirling direction with respect to the center axis.

According to the above configuration, the gas-dissolved water flowing into the fine bubble generator flows into the first fine bubble generation portion. A flow speed of the gas-dissolved water flowing in the first fine bubble generation portion increases as it flows through the diameter-reducing flow path, as a result of which its pressure is reduced. Bubbles are generated as a result of this pressure reduction of the gas-dissolved water. Then, the pressure of the gas-dissolved water is gradually increased as the gas-dissolved water flows through the diameter-increasing flow path. When the pressure of the gas-dissolved water is increased after the bubbles were generated by the pressure reduction, the bubbles included in the gas-dissolved water break up into fine bubbles. Next, the gas-dissolved water that flowed through the first fine bubble generation portion flows into the first swirling flow generation portion of the second fine bubble generation portion. The gas-dissolved water that flowed into the first swirling flow generation portion turns into the swirling flow flowing in the first swirling direction with respect to the center axis of the second fine bubble generation portion by the plurality of first vanes. Then, the gas-dissolved water that flowed out of the first swirling flow generation portion flows into the second swirling flow generation portion. The gas-dissolved water that flowed into the second swirling flow generation portion turns into a swirling flow flowing in the second swirling direction opposite to the first swirling direction with respect to the center axis of the second fine bubble generation portion by the plurality of second vanes. Due to the gas-dissolved water transitioning from being the swirling flow flowing in the first swirling direction to the swirling flow flowing in the second swirling direction, a turbulent flow is thereby generated and enhanced. Due to the turbulent flow being enhanced, the gas-dissolved water flowing along the respective second vanes can easily collide with each other. Due to this collision of the gas-dissolved water, the fine bubbles in the gas-dissolved water break up and are refined into finer bubbles, and a volume of the fine bubbles increases. Thus, the fine bubbles can be generated in large volume.

DETAILED DESCRIPTION

Figure 1:
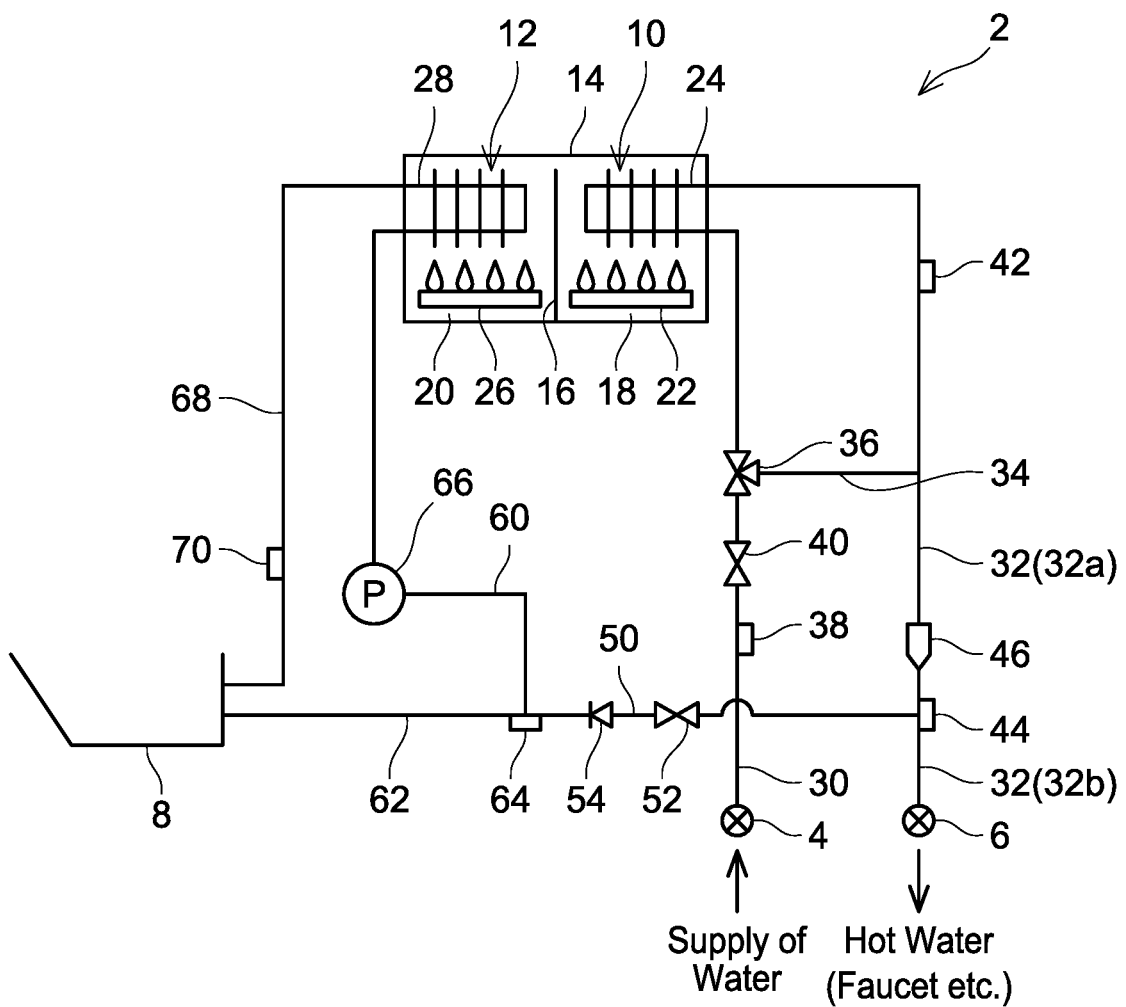
FIG. 1 schematically shows a configuration of a hot water supply system 2 of an embodiment.

A fine bubble generator disclosed herein may comprise: an inlet into which gas-dissolved water in which gas is dissolved flows; an outlet out of which the gas-dissolved water flows; a first fine bubble generation portion disposed between the inlet and the outlet; and a second fine bubble generation portion disposed between the first fine bubble generation portion and the outlet, wherein the first fine bubble generation portion comprises: a diameter-reducing flow path, wherein a flow path diameter of the diameter-reducing flow path reduces from upstream to downstream, and a diameter-increasing flow path disposed downstream than the diameter-reducing flow path, wherein the flow path diameter of the diameter-increasing flow path increases from upstream to downstream, the second fine bubble generation portion comprises: a first swirling flow generation portion; and a second swirling flow generation portion disposed downstream of the first swirling flow generation portion, the first swirling flow generation portion comprises: a first outer peripheral portion; and a plurality of first vanes disposed inside the first outer peripheral portion and configured to generate a first swirling flow flowing in a first swirling direction with respect to a center axis of the second fine bubble generation portion, and the second swirling flow generation portion comprises: a second outer peripheral portion; and a plurality of second vanes disposed inside the second outer peripheral portion and configured to generate a second swirling flow flowing in a second swirling direction opposite to the first swirling direction with respect to the center axis.

In one or more embodiments, when the second fine bubble generation portion is seen along the center axis, each of the first vanes may constitute a pair with its corresponding one of the second vanes, an end of the corresponding second vane on a first swirling direction side may be located more on the first swirling direction side than an end of the first vane on the first swirling direction side is, and an end of the corresponding second vane on a second swirling direction side may be located more on the second swirling direction side than the first swirling direction-side end of the first vane is.

If the first and second vanes completely overlap each other in seeing the second fine bubble generation portion along the center axis direction, majority of the gas-dissolved water that flows from the first swirling flow generation portion into the second swirling flow generation portion can easily flow along vicinities of the ends of the second vanes on the second swirling direction side. In this case, the gas-dissolved water would easily flow out of the second swirling flow generation portion before the swirling flow flowing in the second swirling direction is generated in the gas-dissolved water that flowed into the second swirling flow generation portion. To the contrary, according to the above configuration, when the second fine bubble generation portion is seen along the center axis direction, the end of each first vane on the first swirling direction side is located between the end of its corresponding second vane on the first swirling direction side and the end of this corresponding second vane on the second swirling direction side. In this case, the majority of the gas-dissolved water that flows into the second swirling flow generation portion can easily flow out past the ends of the second vanes on the first swirling direction side. Due to this, in the second swirling flow generation portion, the majority of the gas-dissolved water turns into the swirling flow flowing in the second swirling direction, as a result of which the turbulent flow is further enhanced. Thus, the gas-dissolved water flowing along the second vanes can more easily collide with each other. As a result of this, the fine bubbles can be generated in larger volume.

In one or more embodiments, each of upstream-side surfaces of the first vanes and upstream-side surfaces of the second vanes may comprise an upstream-side protrusion protruding to an upstream side.

According to the above configuration, the gas-dissolved water flowing along the first vanes of the first swirling flow generation portion in the first swirling direction collides with the upstream-side protrusions disposed on the upstream-side surfaces of the first vanes, and the turbulent flow of the gas-dissolved water is thereby enhanced. Due to this, the gas-dissolved water flowing along the respective first vanes can easily collide with each other. Further, the gas-dissolved water flowing along the second vanes of the second swirling flow generation portion in the second swirling direction collides with the upstream-side protrusions disposed on the upstream-side surfaces of the second vanes, and the turbulent flow of the gas-dissolved water is thereby enhanced. Due to this, the gas-dissolved water flowing along the respective second vanes can easily collide with each other. Thus, the fine bubbles can be generated in larger volume.

In one or more embodiments, each of downstream-side surfaces of the first vanes and downstream-side surfaces of the second vanes comprises a downstream-side protrusion protruding to a downstream side.

According to the above configuration, the gas-dissolved water that flowed out from each first vane of the first swirling flow generation portion collides with the downstream-side protrusion disposed on the downstream-side surface of another first vane adjacent to that first vane in the first swirling direction, and the turbulent flow of the gas-dissolved water is thereby enhanced. Due to this, the gas-dissolved water that flowed out from each first vane can easily collide with each other. Further, the gas-dissolved water that flowed out from each second vane of the second swirling flow generation portion collides with the downstream-side protrusion disposed on the downstream-side surface of another second vane adjacent to that second vane in the second swirling direction, and the turbulent flow of the gas-dissolved water is thereby enhanced. Due to this, the gas-dissolved water that flowed out from each second vane can easily collide with each other. Thus, the fine bubbles can be generated in larger volume.

In one or more embodiments, each of upstream-side surfaces of the first vanes and upstream-side surfaces of the second vanes may comprise an upstream-side protrusion protruding to an upstream side. Each of downstream-side surfaces of the first vanes and downstream-side surfaces of the second vanes may comprise a downstream-side protrusion protruding to a downstream side. A distance between the center axis and each of the upstream-side protrusions may be different from a distance between the center axis and each of the downstream-side protrusions.

According to the above configuration, in the first swirling flow generation portion, the gas-dissolved water that flowed out from each first vane without colliding with the upstream-side protrusion can be caused to collide with the downstream-side protrusion on the downstream-side surface of another first vane adjacent to that first vane in the first swirling direction. In the second swirling flow generation portion as well, the gas-dissolved water that flowed out from each second vane without colliding with the upstream-side protrusion can be caused to collide with the downstream-side protrusion on the downstream-side surface of another second vane positioned adjacent to that second vane in the second swirling direction. That is, likelihood of the gas-dissolved water colliding with at least one of the upstream-side protrusions and the downstream-side protrusions in the first swirling flow generation portion can be increased, and likelihood of the gas-dissolved water colliding with at least one of the upstream-side protrusions and the downstream-side protrusions in the second swirling flow generation portion can also be increased. Thus, the turbulent flow of the gas-dissolved water can be enhanced, and the fine bubbles can be generated in larger volume.

Embodiments (Configuration of Hot Water Supply System 2; FIG. 1)

A hot water supply system 2 shown in FIG. 1 is configured to heat water supplied from a water source 4 such as a public tap water system, and deliver the water heated to a desired temperature to a faucet 6 installed in a kitchen or a bathtub 8 installed in a bathroom. Further, the hot water supply system 2 is configured capable of reheating the water in the bathtub 8.

The hot water supply system 2 includes a first heating device 10, a second heating device 12, and a burner chamber 14. The first heating device 10 is a heating device used to supply hot water to the faucet 6 and the bathtub 8. The second heating device 12 is a heating device used to reheat the water in the bathtub 8. Inside of the burner chamber 14 is partitioned into a first burner chamber 18 and a second burner chamber 20 by a wall 16. The first heating device 10 is housed in the first burner chamber 18 and the second heating device 12 is housed in the second burner chamber 20.

The first heating device 10 includes a first burner 22 and a first heat exchanger 24. The second heating device 12 includes a second burner 26 and a second heat exchanger 28.

An upstream end of the first heat exchanger 24 of the first heating device 10 is connected to a downstream end of a water supply passage 30. Water from the water source 4 is supplied to an upstream end of the water supply passage 30. A downstream end of the first heat exchanger 24 is connected to an upstream end of a hot water supply passage 32. The water supply passage 30 and the hot water supply passage 32 are connected by a bypass passage 34. A bypass servo valve 36 is disposed at a connection between the water supply passage 30 and the bypass passage 34. The bypass servo valve 36 is configured to adjust a flow rate of the water sent from the water supply passage 30 to the first heating device 10 and a flow rate of the water sent from the water supply passage 30 to the bypass passage 34. Low-temperature water delivered through the water supply passage 30 and the bypass passage 34 is mixed with high-temperature water delivered through the water supply passage 30, the first heating device 10, and the hot water supply passage 32 at a connection between the bypass passage 34 and the hot water supply passage 32. A water flow metering sensor 38 and a water flow servo valve 40 are disposed on the water supply passage 30 upstream of the bypass servo valve 36. The water flow metering sensor 38 is configured to detect a flow rate of the water that flows in the water supply passage 30. The water flow servo valve 40 is configured to adjust the flow rate of the water that flows in the water supply passage 30. A heat exchanger outlet thermistor 42 is disposed on the hot water supply passage 32 upstream of the connection thereof with the bypass passage 34.

An upstream end of a bathtub-filling passage 50 is connected to the hot water supply passage 32 downstream of the connection thereof with the bypass passage 34. A hot water-supplying thermistor 44 is disposed at a connection between the hot water supply passage 32 and the bathtub-filling passage 50. A fine bubble generator 46 is disposed between the connection of the hot water supply passage 32 and the bypass passage 34 and a connection of the hot water supply passage 32 and the bathtub-filling passage 50. The fine bubble generator 46 will be described later in detail. Hereinbelow, a part of the hot water supply passage 32 upstream of the fine bubble generator 46 may be termed a first hot water supply passage 32a, and a part of the hot water supply passage 32 downstream of the fine bubble generator 46 may be termed a second hot water supply passage 32b.

A downstream end of the bathtub-filling passage 50 is connected to an upstream end of a reheating passage 60 and a downstream end of a first bathtub circulation passage 62. A downstream end of the reheating passage 60 is connected to an upstream end of the second heat exchanger 28. An upstream end of the first bathtub circulation passage 62 is connected to the bathtub 8. A reheating control valve 52 and a check valve 54 are disposed on the bathtub-filling passage 50. The reheating control valve 52 is configured to open and close the bathtub-filling passage 50. The check valve 54 is configured to allow a waterflow from upstream to downstream of the bathtub-filling passage 50 and prohibit a waterflow from downstream to upstream of the bathtub-filling passage 50. A bathtub returning thermistor 64 is disposed at a connection between the bathtub-filling passage 50, the reheating passage 60, and the first bathtub circulation passage 62. A circulation pump 66 is disposed on the reheating passage 60.

A downstream end of the second heat exchanger 28 of the second heating device 12 is connected to an upstream end of a second bathtub circulation passage 68. A downstream end of the second bathtub circulation passage 68 is connected to the bathtub 8. A bathtub outflow thermistor 70 is disposed on the second bathtub circulation passage 68.

When the hot water supply system 2 is to supply hot water to the faucet 6, the first burner 22 of the first heating device 10 operates with the reheating control valve 52 closed. In this case, the water supplied from the water source 4 to the water supply passage 30 is heated by heat exchange in the first heat exchanger 24 and is then delivered to the faucet 6 through the hot water supply passage 32. A temperature of the water flowing in the hot water supply passage 32 can be adjusted to a desired temperature by adjusting a combustion amount of the first burner 22 of the first heating device 10 and an opening degree of the bypass servo valve 36.

When the hot water supply system 2 is to fill the bathtub 8 with hot water, the first burner 22 of the first heating device 10 operates with the reheating control valve 52 open. In this case, the water supplied from the water source 4 to the water supply passage 30 is heated by the heat exchange in the first heat exchanger 24 and then flows into the bathtub-filling passage 50 from the hot water supply passage 32. At this occasion, the water temperature is adjusted to a desired temperature by the adjustment of the combustion amount of the first burner 22 of the first heating device 10 and the adjustment of the opening degree of the bypass servo valve 36. The water that flowed into the bathtub-filling passage 50 flows into the bathtub 8 through the first bathtub circulation passage 62 and also flows into the bathtub 8 through the reheating passage 60 and the second bathtub circulation passage 68.

When the hot water supply system 2 is to reheat the water in the bathtub 8, the circulation pump 66 operates with the reheating control valve 52 closed, and the second burner 26 of the second heating device 12 is operated. In this case, the water in the bathtub 8 flows into the first bathtub circulation passage 62 and is sent to the second heating device 12 through the reheating passage 60. The water sent to the second heating device 12 is heated by heat exchange in the second heat exchanger 28, and then flows into the second bathtub circulation passage 68. At this occasion, the water temperature is adjusted to a desired temperature by an adjustment of a combustion amount of the second burner 26 of the second heating device 12. The water that flowed into the second bathtub circulation passage 68 is returned to the bathtub 8.

(Configuration of Fine Bubble Generator 46; FIGS. 2 to 14)

Figure 2:
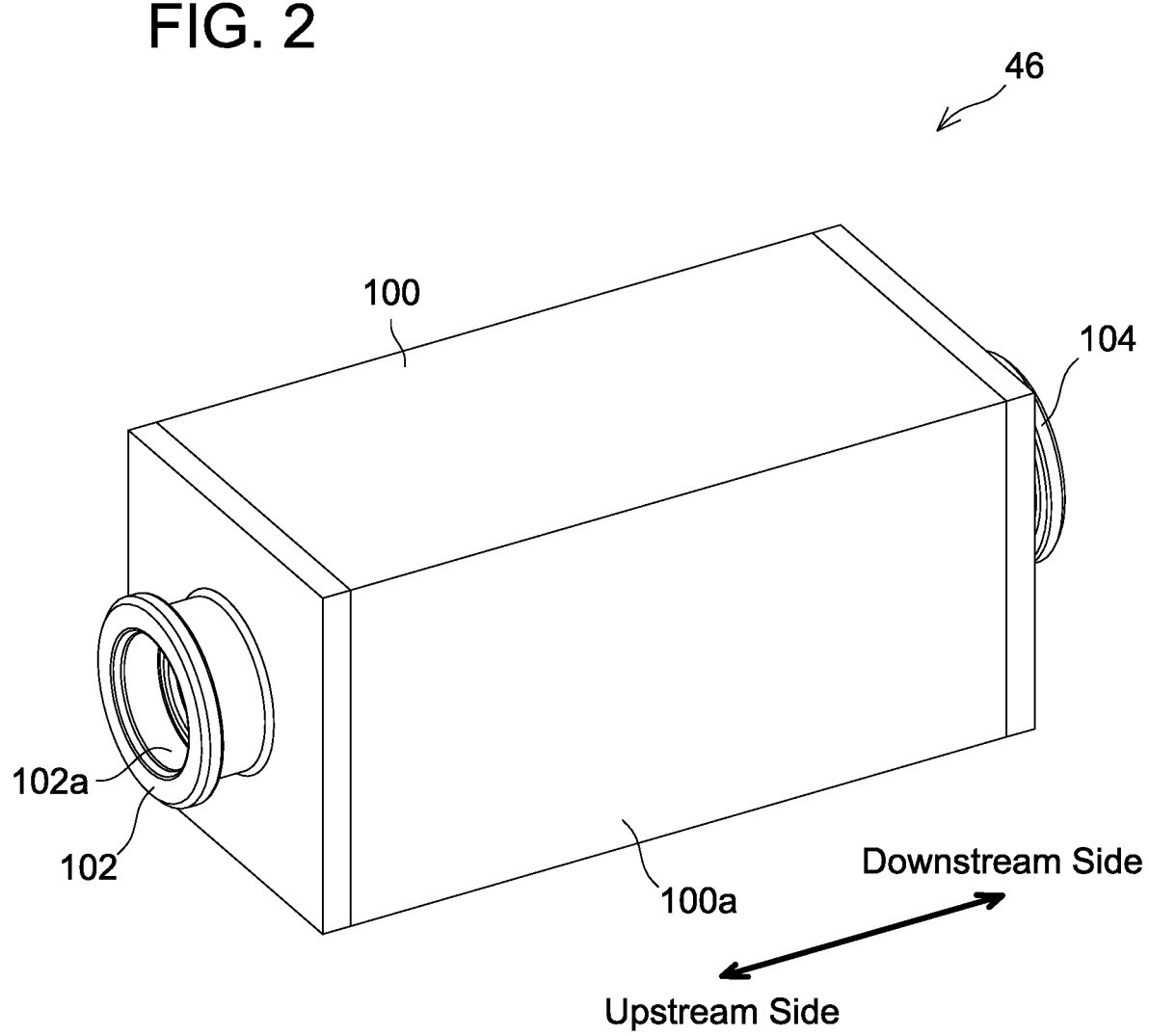
FIG. 2 is a perspective view of a fine bubble generator 46 of the embodiment.
Figure 3:
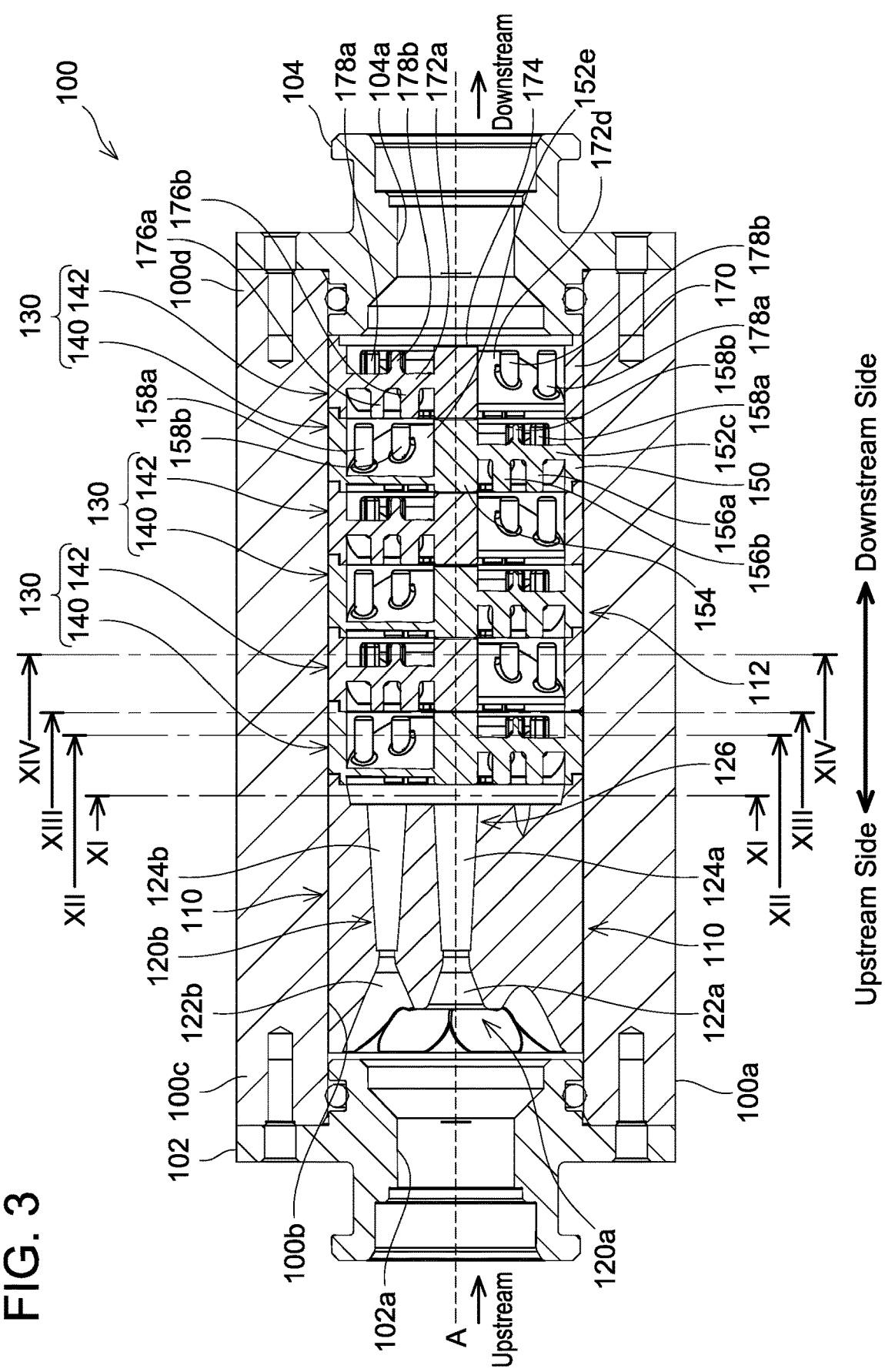
FIG. 3 is a cross-sectional view of the fine bubble generator 46 of the embodiment.
Figure 10:
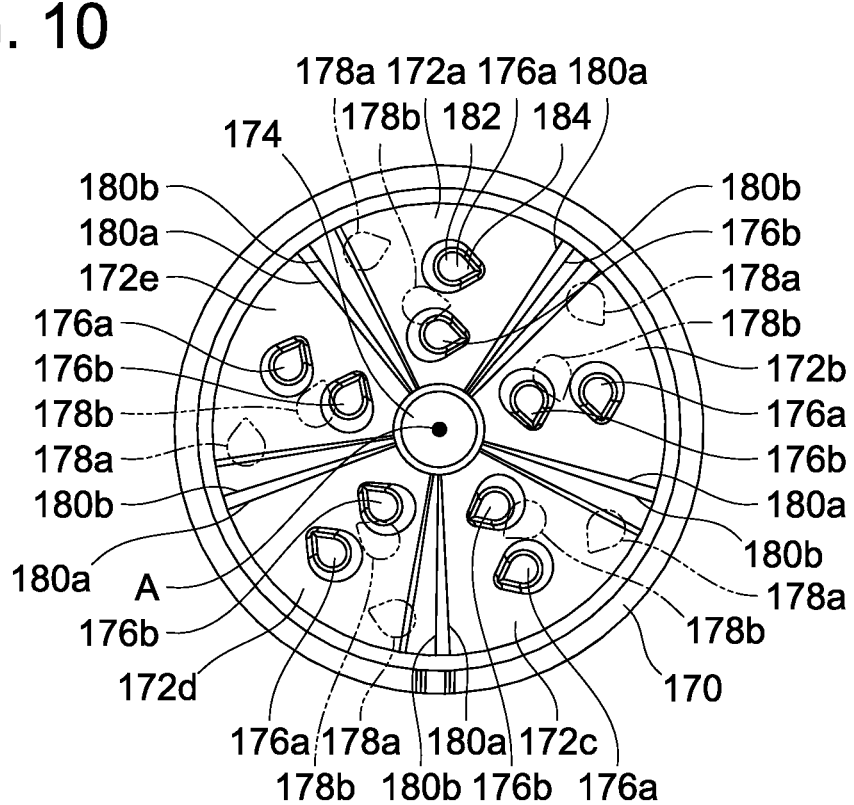
FIG. 10 shows a second swirling flow generation portion 142 of the embodiment seen from the upstream side.
Figure 11:
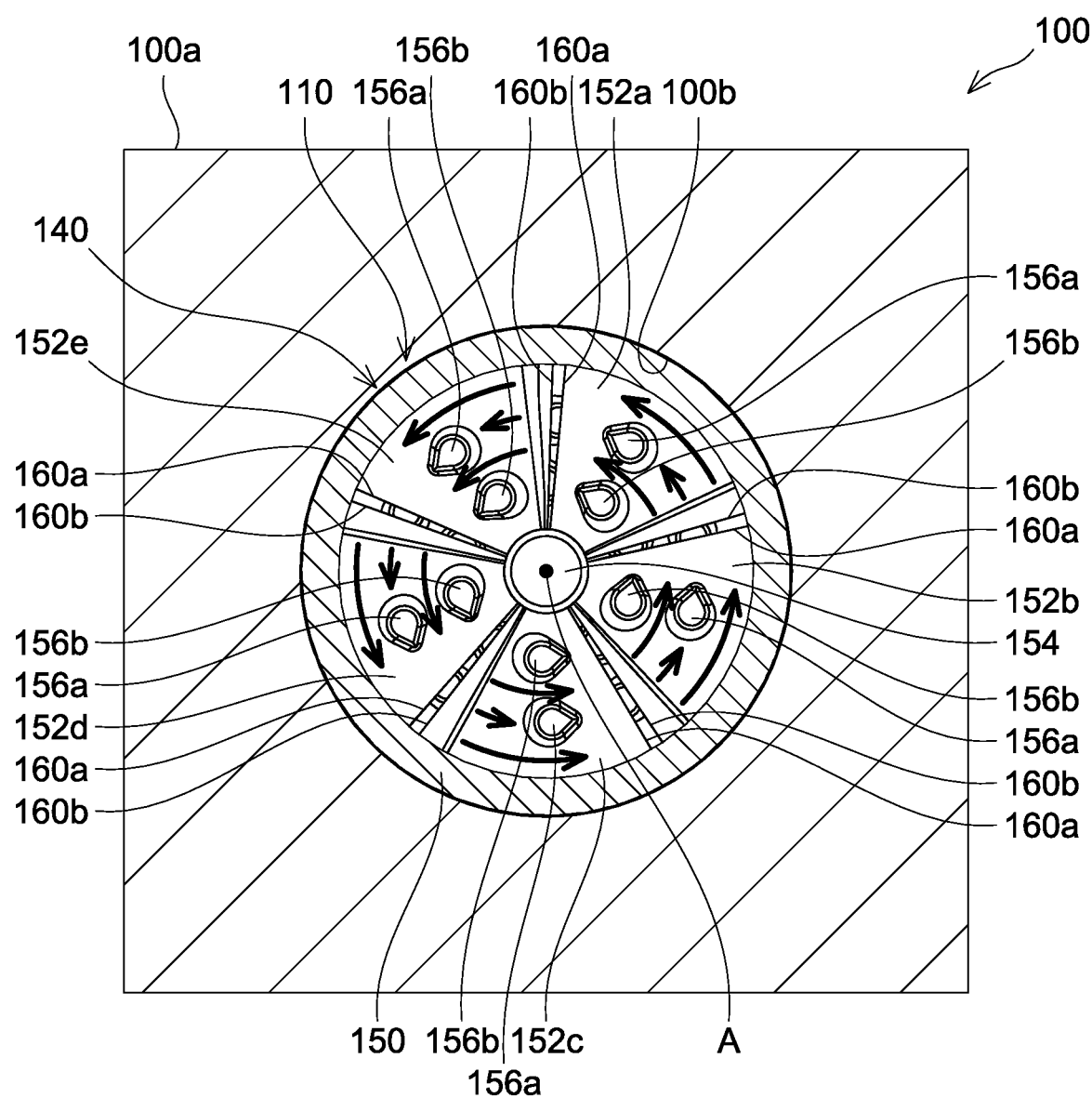
FIG. 11 is a cross-sectional view along a line XI-XI of FIG. 3.

Next, the fine bubble generator 46 disposed on the hot water supply passage 32 will be described with reference to FIGS. 2 to 14. As shown in FIG. 2, the fine bubble generator 46 includes a main body casing 100, an inlet 102, and an outlet 104. An outer wall 100a of the main body casing 100 has a square columnar shape. As shown in FIG. 11, when the fine bubble generator 46 is seen along a direction of a center axis A of the fine bubble generator 46, an inner wall 100b of the main body casing 100 has a circular shape. Hereinbelow, the center axis A of the fine bubble generator 46 may simply be termed "the center axis A". As shown in FIG. 3, the inlet 102 is fixed to an upstream end 100c of the main body casing 100 by screws (not shown). An inlet opening 102a is defined in the inlet 102. The inlet 102 is connected to a downstream end of the first hot water supply passage 32a (see FIG. 1). The outlet 104 is fixed to a downstream end 100d of the main body casing 100 by screws (not shown). An outlet opening 104a is defined in the outlet 104. The outlet 104 is connected to an upstream end of the second hot water supply passage 32b (see FIG. 1).

The main body casing 100 houses a first fine bubble generation portion 110 and a second fine bubble generation portion 112. The first fine bubble generation portion 110 and the second fine bubble generation portion 112 are arranged along the center axis A. The first fine bubble generation portion 110 and the second fine bubble generation portion 112 are arranged in the order of the first fine bubble generation portion 110 and the second fine bubble generation portion 112 from the upstream side to the downstream side. A "clockwise direction" and a "counterclockwise direction" described hereinbelow refer to such directions in viewing the fine bubble generator 46 from an upstream side along the center axis A direction of the fine bubble generator 46.

(Configuration of First Fine Bubble Generation Portion 110; FIGS. 3 to 6)

Figure 4:
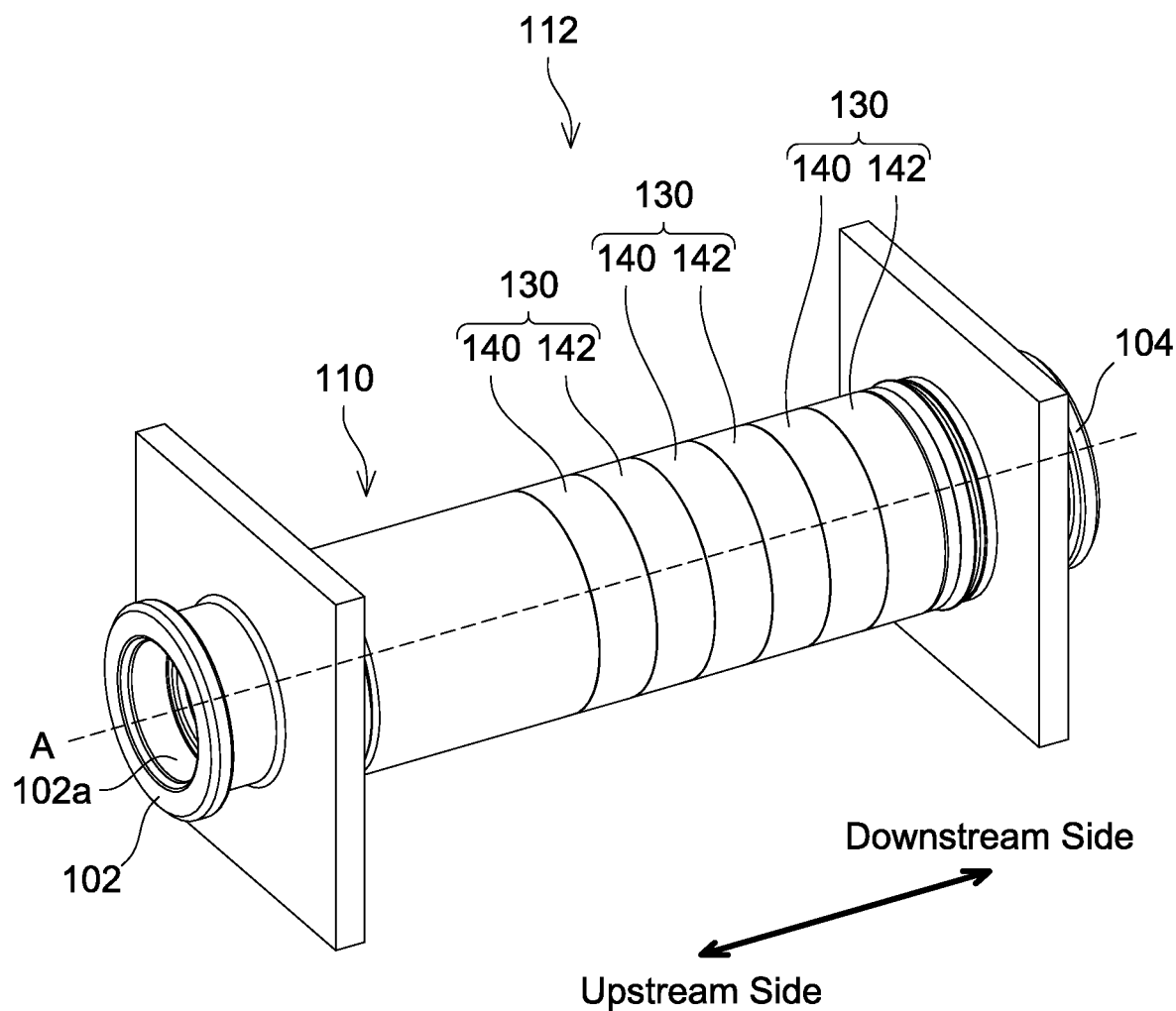
FIG. 4 is a perspective view in a state of having detached a main body casing 100 of the fine bubble generator 46 of the embodiment.

Next, the first fine bubble generation portion 110 will be described with reference to FIGS. 3 to 6. As shown in FIGS. 3 and 4, the first fine bubble generation portion 110 has a cylindrical shape. As shown in FIG. 3, an outer diameter of the first fine bubble generation portion 110 is same as an inner diameter of the main body casing 100. A center axis of the first fine bubble generation portion 110 coincides with the center axis A.

Figure 5:
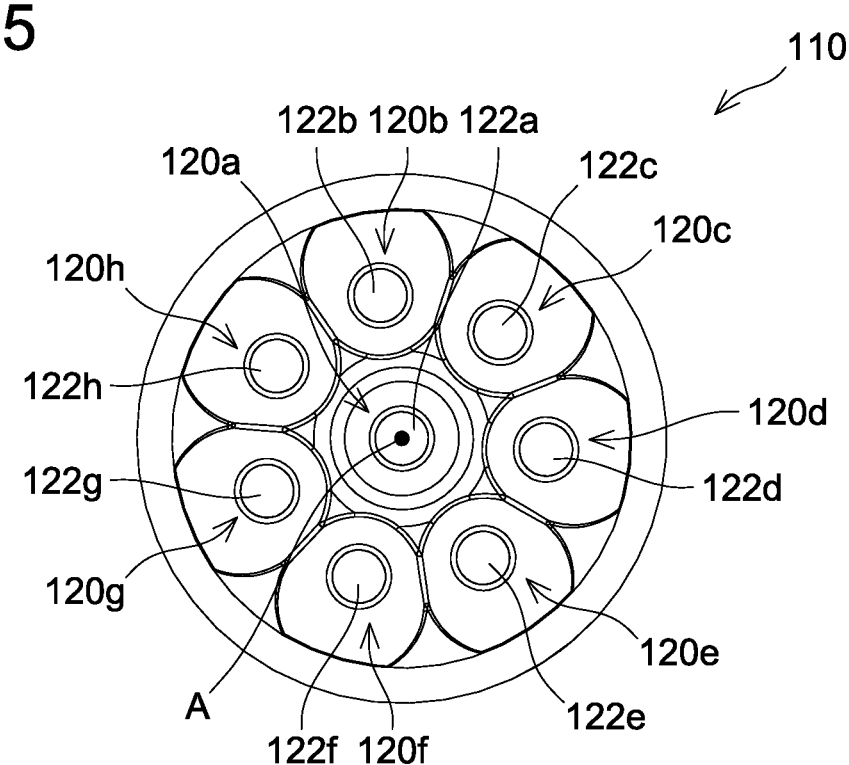
FIG. 5 is a diagram seeing a first fine bubble generation portion 110 of the embodiment from an upstream side.
Figure 6:
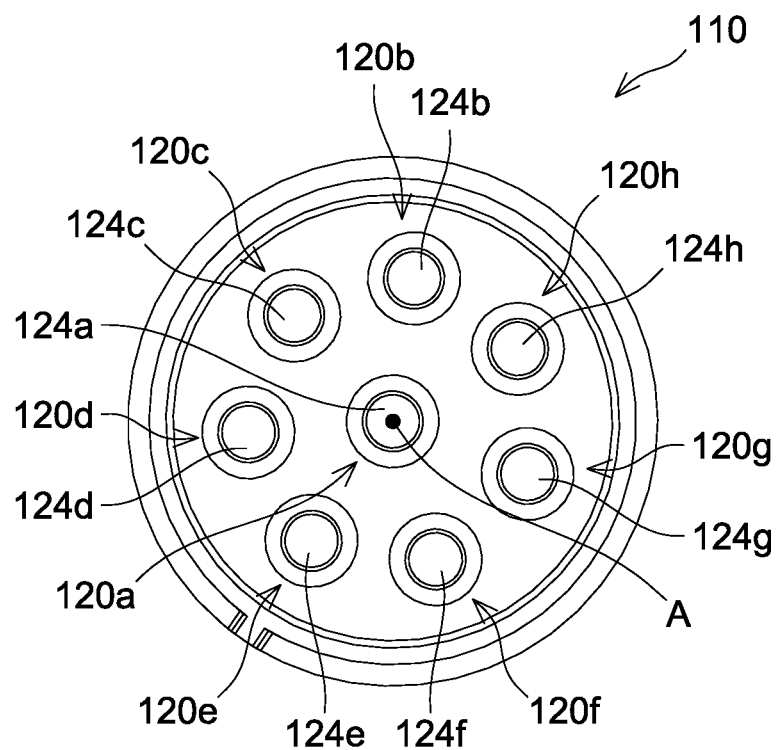
FIG. 6 is a diagram seeing the first fine bubble generation portion 110 of the embodiment from the upstream side.

As shown in FIGS. 3, 5, and 6, the first fine bubble generation portion 110 includes eight venturi portions 120a to 120h. The venturi portion 120a is disposed in a central area of the first fine bubble generation portion 110. The venturi portion 120a is arranged on the center axis A. As shown in FIG. 3, a diameter-reducing flow path 122a of which flow path diameter reduces from upstream to downstream is disposed in an upstream portion of the venturi portion 120a. A flow path diameter of an upstream end of the diameter-reducing flow path 122a is smaller than a flow path diameter of the inlet opening 102a of the inlet 102. A diameter-increasing flow path 124a of which flow path diameter increases from upstream to downstream is disposed in the venturi portion 120a downstream of the diameter-reducing flow path 122a.

As shown in FIGS. 5 and 6, the venturi portions 120b to 120h are disposed radially outside the venturi portion 120a with respect to the center axis A. The venturi portions 120b to 120h are arranged at regular intervals along a circumferential direction about the center axis A. The venturi portions 120b to 120h respectively include corresponding pairs of diameter-reducing flow paths 122b to 122h (see FIG. 5) and diameter-increasing flow paths 124b to 124h (see FIG. 6) similar to the venturi portion 120a. An upstream flow path 126 in the first fine bubble generation portion 110 is defined by the diameter-reducing flow paths 122a to 122h and the diameter-increasing flow paths 124a to 124h. The number of the venturi portions 120 disposed in the first fine bubble generation portion 110 is not limited to eight; it may be any of one to seven, or may be nine or more. As shown in FIG. 3, water that flows into the first fine bubble generation portion 110 from the inlet 102 flows into the second fine bubble generation portion 112 through the upstream flow path 126.

(Configuration of Second Fine Bubble Generation Portion 112; FIGS. 3, 4, and 7 to 14)

Next, the second fine bubble generation portion 112 will be described with reference to FIGS. 3, 4, and 7 to 14. As shown in FIGS. 3 and 4, a center axis of the second fine bubble generation portion 112 coincides with the center axis A. The second fine bubble generation portion 112 includes three cell units 130. The three cell units 130 are disposed along the center axis A.

Figure 7:
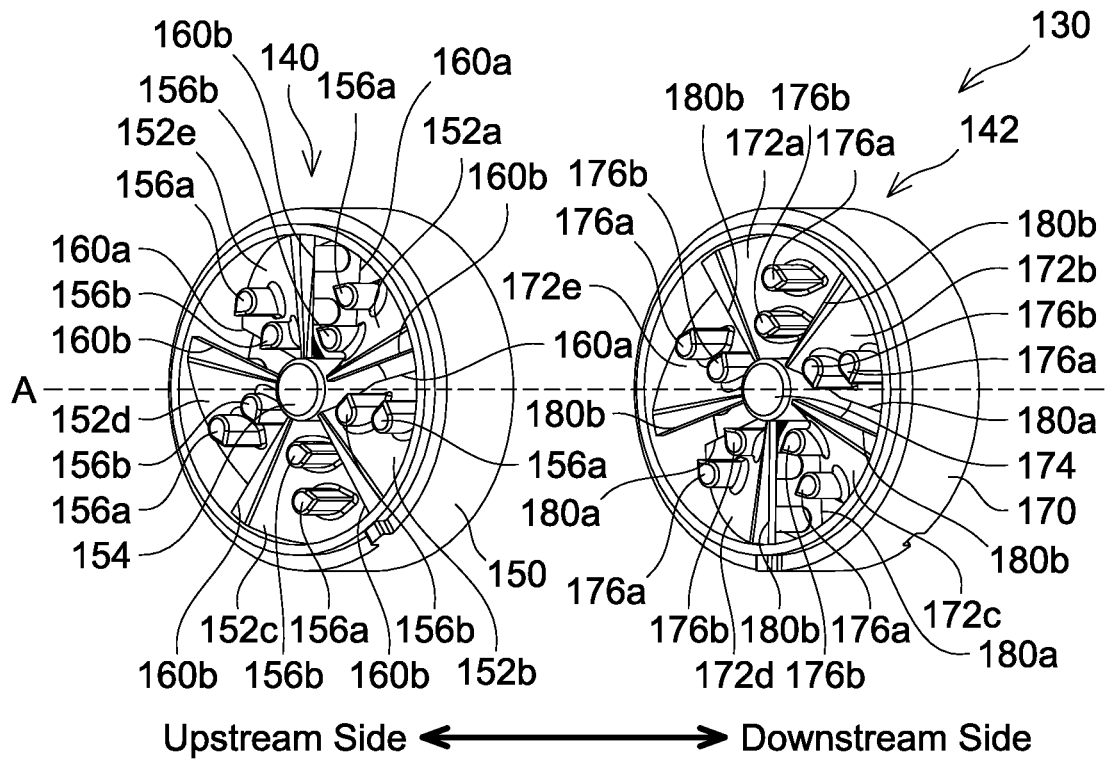
FIG. 7 is a disassembled diagram seeing a cell unit 130 of a second fine bubble generation portion 112 of the embodiment from the upstream side.
Figure 8:
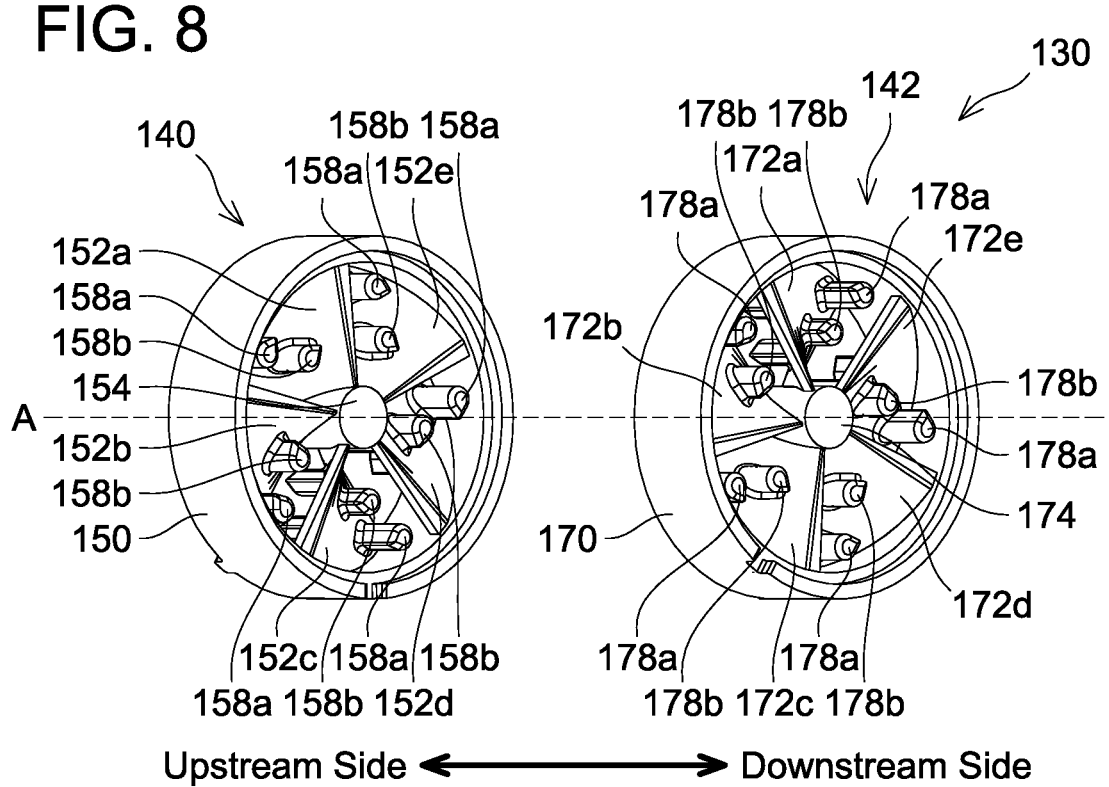
FIG. 8 is a disassembled diagram seeing the cell unit 130 of the second fine bubble generation portion 112 of the embodiment from the downstream side.

As shown in FIGS. 7 and 8, each cell unit 130 includes a first swirling flow generation portion 140 and a second swirling flow generation portion 142. As shown in FIG. 3, the first swirling flow generation portion 140 and the second swirling flow generation portion 142 are arranged in the order of the first swirling flow generation portion 140 and the second swirling flow generation portion 142 from the upstream side to the downstream side.

Figure 9:
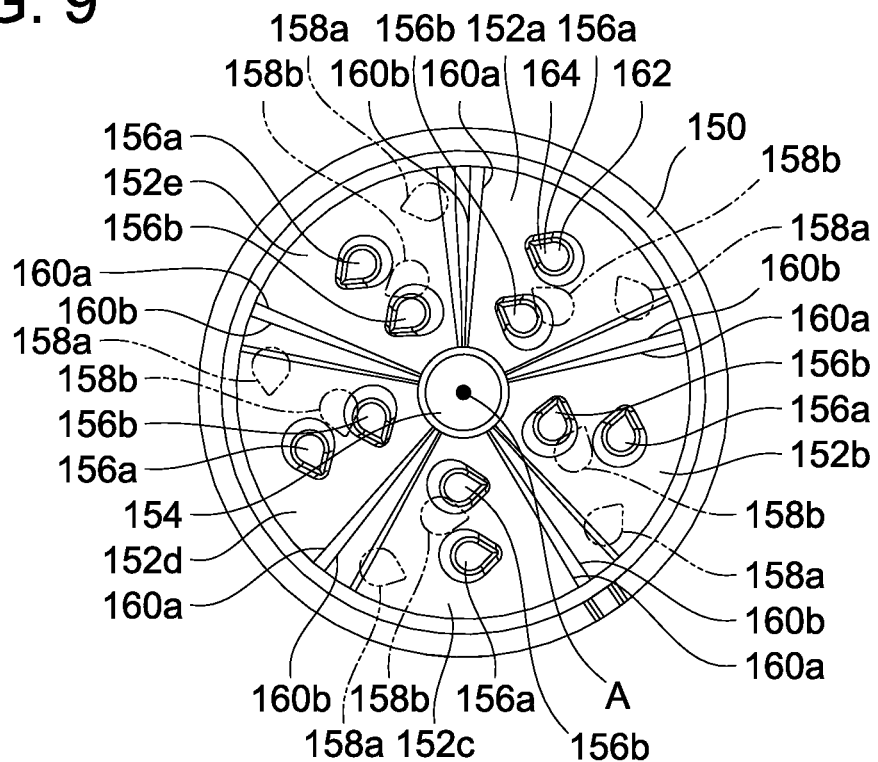
FIG. 9 shows a first swirling flow generation portion 140 of the embodiment seen from the upstream side.

As shown in FIG. 7, each first swirling flow generation portion 140 includes a first cylindrical portion 150, five first vanes 152a to 152e, and a first shaft portion 154. Hereinbelow, the five first vanes 152a to 152e may simply be termed "first vanes 152" as a collective term. As shown in FIG. 3, an outer diameter of the first cylindrical portion 150 is same as the inner diameter of the main body casing 100. The first cylindrical portion 150 and the first shaft portion 154 are disposed along the center axis A. Due to this, center axes of the first cylindrical portion 150 and the first shaft portion 154 coincide with the center axis of the second fine bubble generation portion 112. The first vanes 152 each connect an inner wall of the first cylindrical portion 150 with an outer wall of the first shaft portion 154. As shown in FIG. 7, the first vanes 152 are tilted down toward the downstream side along the counterclockwise direction. Two first upstream-side protrusions 156a, 156b protruding upstream are disposed on an upstream-side surface of each of the first vanes 152. As shown in FIG. 9, a clockwise end of each first upstream-side protrusion 156b on a radially inner side is disposed slightly on the clockwise side of a virtual line connecting the center axis A and a clockwise end of its corresponding first upstream-side protrusion 156a disposed on a radially outer side. Each of the first upstream-side protrusions 156a includes a half column portion 162 and a narrowing portion 164 that narrows down toward the counterclockwise direction. The first upstream-side protrusions 156a have a so-called teardrop cross-sectional shape. When the fine bubble generator 46 is seen along the center axis A direction, a cross-sectional shape of the first upstream-side protrusion 156b is same as the cross-sectional shape of the first upstream-side protrusion 156a.

As shown in FIG. 8, two first downstream-side protrusions 158a, 158b protruding downstream are disposed on a downstream-side surface of each of the first vanes 152. As shown in FIG. 9, a clockwise end of each first downstream-side protrusion 158b on the radially inner side is disposed slightly on the counterclockwise side of a virtual line connecting the center axis A and a clockwise end of its corresponding first downstream-side protrusion 158a disposed on the radially outer side. When the fine bubble generator 46 is seen along the center axis A direction, a cross-sectional shape of the first downstream-side protrusions 158a, 158b is same as the cross-sectional shape of the first upstream-side protrusion 156a. In the radial direction, the first downstream-side protrusions 158a are disposed on the outer side than the first upstream-side protrusions 156a, and the first downstream-side protrusions 158b are each disposed between its corresponding first upstream-side protrusion 156a and first upstream-side protrusion 156b. That is, a distance between each first upstream-side protrusion 156a and the center axis A, a distance between each first upstream-side protrusion 156b and the center axis A, a distance between each first downstream-side protrusion 158a and the center axis A, and a distance between each first downstream-side protrusion 158b and the center axis A are different.

Figure 12:
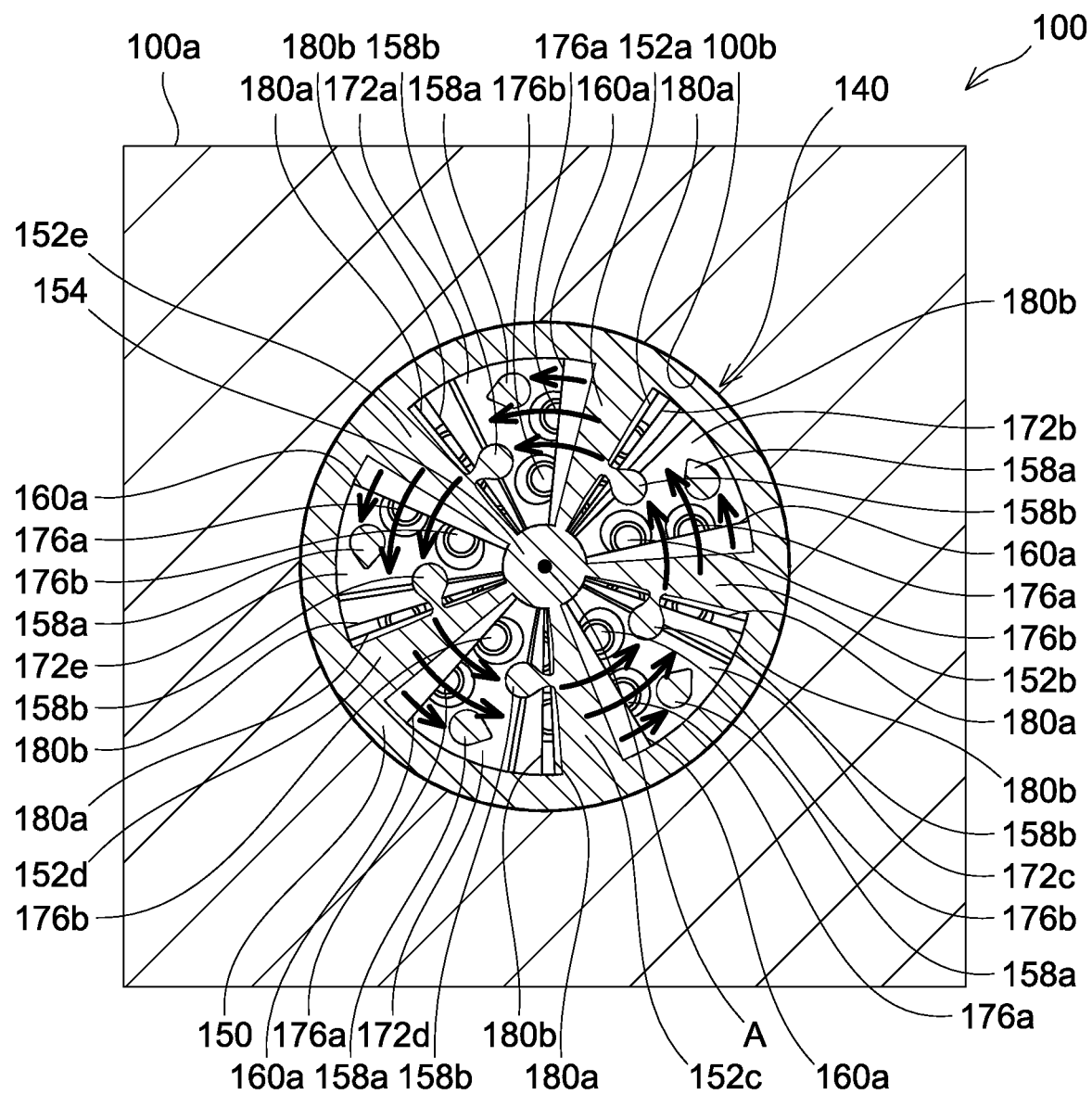
FIG. 12 is a cross-sectional view along a line XII-XII of FIG. 3.
Figure 14:
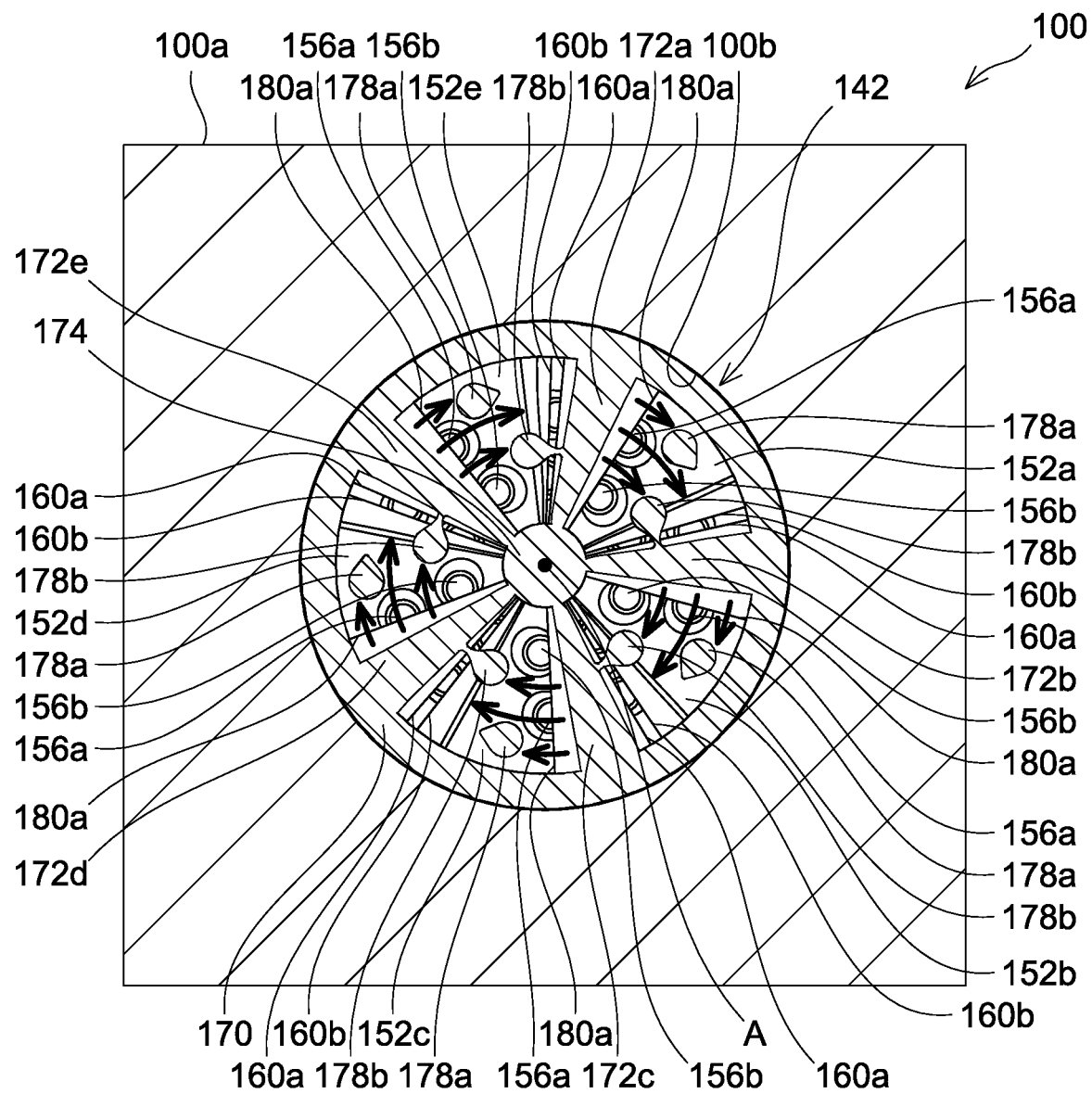
FIG. 14 is a cross-sectional view along a line XIV-XIV of FIG. 3.

As shown in FIG. 7, each second swirling flow generation portion 142 includes a second cylindrical portion 170, five second vanes 172a to 172e, and a second shaft portion 174. Hereinbelow, the five second vanes 172a to 172e may simply be termed "second vanes 172" as a collective term. As shown in FIG. 3, an outer diameter of the second cylindrical portion 170 is same as the inner diameter of the main body casing 100. The second cylindrical portion 170 and the second shaft portion 174 are disposed along the center axis A. Due to this, center axes of the second cylindrical portion 170 and the second shaft portion 174 coincide with the center axis of the second fine bubble generation portion 112. The second vanes 172 each connect an inner wall of the second cylindrical portion 170 with an outer wall of the second shaft portion 174. As shown in FIG. 7, the second vanes 172 are tilted down toward the downstream side along the clockwise direction. That is, the second vanes 172 are tilted toward an opposite direction from that of the first vanes 152 of the first swirling flow generation portion 140. Two second upstream-side protrusions 176a, 176b protruding upstream are disposed on an upstream-side surface of each of the second vanes 172. As shown in FIG. 10, a counterclockwise end of each second upstream-side protrusion 176b on the radially inner side is disposed slightly on the counterclockwise side of a virtual line connecting the center axis A and a counterclockwise end of its corresponding second upstream-side protrusion 176a disposed on the radially outer side. Each of the second upstream-side protrusions 176a includes a half column portion 182 and a narrowing portion 184 that narrows down toward the clockwise direction. The second upstream-side protrusions 176a have a so-called teardrop cross-sectional shape. When the fine bubble generator 46 is seen along the center axis A direction, a cross-sectional shape of the second upstream-side protrusion 176b is same as the cross-sectional shape of the second upstream-side protrusion 176a. As shown in FIG. 12, when the fine bubble generator 46 is seen from the upstream side along the center axis A direction, a second inlet end 180b of the second vane 172a on the counterclockwise side is positioned on the counterclockwise side than a first outlet end 160a of the first vane 152a on the counterclockwise side is, and a second outlet end 180a of each second vane 172 on the clockwise side is positioned on the clockwise side than the first outlet end 160a of its corresponding first vane 152 is. Further, as shown in FIG. 14, when the fine bubble generator 46 is seen from the upstream side along the center axis A direction, a first inlet end 160b of the first vane 152a on the clockwise side is positioned on the clockwise side than the second outlet end 180a of the second vane 172a is, and the first outlet end 160a of the first vane 152a is positioned on the counterclockwise side than the second outlet end 180a of the second vane 172a is. That is, when the fine bubble generator 46 is seen from the upstream side along the center axis A direction, the first vanes 152a to 152e do not completely overlap with the second vanes 172a to 172e.

As shown in FIG. 8, two second downstream-side protrusions 178a, 178b protruding downstream are disposed on a downstream-side surface of each of the second vanes 172. As shown in FIG. 10, a counterclockwise end of each second downstream-side protrusion 178b on the radially inner side is disposed on the clockwise side of a virtual line connecting the center axis A and a counterclockwise end of its corresponding second downstream-side protrusion 178a disposed on the radially outer side. When the fine bubble generator 46 is seen along the center axis A direction, a cross-sectional shape of the second downstream-side protrusions 178a, 178b is same as the cross-sectional shape of the second upstream-side protrusions 176a. In the radial direction, the second downstream-side protrusions 178a are disposed on the outer side than the second upstream-side protrusions 176a, and the second downstream-side protrusions 178b are each disposed between its corresponding second upstream-side protrusion 176a and second upstream-side protrusion 176b. That is, a distance between each second upstream-side protrusion 176a and the center axis A, a distance between each second upstream-side protrusion 176b and the center axis A, a distance between each second downstream-side protrusion 178a and the center axis A, and a distance between each second downstream-side protrusion 178b and the center axis A are different.

Next, fine bubbles generated by the fine bubble generator 46 will be described with reference to FIGS. 3 and 11 to 14. Solid-line arrows in FIGS. 11 to 14 indicate directions of water flow. The fine bubble generator 46 of the present embodiment is configured to generate fine bubbles using air contained in the water supplied from the water source 4, such as the public tap water system. The water supplied from the public tap water system has air (oxygen, carbon dioxide, nitrogen, etc.) dissolved therein. Hereinbelow, water in which air is dissolved will be termed "air-dissolved water". Further, hereinbelow, explanation will be given by assuming a situation in which the faucet 6 is operated by a user. As shown in FIG. 1, when the faucet 6 is operated by the user, the first burner 22 of the first heating device 10 operates with the reheating control valve 52 closed. The air-dissolved water supplied from the water source 4 to the water supply passage 30 is heated by heat exchange in the first heat exchanger 24, and then flows into the fine bubble generator 46 through the first hot water supply passage 32a.

Prior to explaining the fine bubbles generated by the fine bubble generator 46, reason why the fine bubble generator 46 is disposed on the first hot water supply passage 32a will be described. A dissolved air quantity indicating a quantity of air dissolvable in water becomes smaller in water with higher temperature. Further, bubbles are generated easier when the quantity of air dissolved in water is closer to the dissolved air quantity. Although details will be given later, in the fine bubble generator 46, bubbles are generated in the air-dissolved water, and fine bubbles are generated by refining the bubbles. Due to this, a volume of the fine bubbles can be increased when a larger volume of bubbles are generated from the air-dissolved water. Due to this reason, the fine bubble generator 46 in the present embodiment is disposed on the first hot water supply passage 32a where the water heated by the first heating device 10 flows.

As shown in FIG. 3, the air-dissolved water that flowed into the fine bubble generator 46 flows through the inlet opening 102a of the inlet 102 and into the upstream flow path 126 in the first fine bubble generation portion 110. The air-dissolved water that flowed into the upstream flow path 126 then flows into the venturi portions 120a to 120h. For example, the air-dissolved water that flowed into the venturi portion 120a flows into the diameter-reducing flow path 122a. The air-dissolved water that flowed into the diameter-reducing flow path 122a increases its flow speed as it flows through the diameter-reducing flow path 122a, and its pressure is reduced as a result. Bubbles are generated as a result of the pressure of the air-dissolved water being reduced. The air-dissolved water that flowed through the diameter-reducing flow path 122a flows into the diameter-increasing flow path 124a. The air-dissolved water that flowed into the diameter-increasing flow path 124a reduces its flow speed as it flows through the diameter-increasing flow path 124a, and its pressure is increased as a result. When the pressure of the air-dissolved water is increased after the bubbles were generated by the pressure reduction, the bubbles contained in the air-dissolved water break up into fine bubbles. The water that flowed through the diameter-increasing flow path 124a flows into the second fine bubble generation portion 112. As above, the fine bubbles are generated as a result of the air-dissolved water flowing through the venturi portion 120a. Fine bubbles are also generated in the air-dissolved water that flows through the venturi portions 120b to 120h as the air-dissolved water flows through the venturi portions 120b to 120h. The air-dissolved water that flowed through the upstream flow path 126 in the first fine bubble generation portion 110 flows into the second fine bubble generation portion 112.

The air-dissolved water that flows out from the first fine bubble generation portion 110 flows into the first swirling flow generation portion 140 of the most upstream cell unit 130 among the three cell units 130 of the second fine bubble generation portion 112. As shown in FIG. 11, the air-dissolved water that flowed into the first swirling flow generation portion 140 becomes a swirling flow flowing in the counterclockwise direction by passing past the first vanes 152 of the first swirling flow generation portion 140. A part of the air-dissolved water collides with the first upstream-side protrusions 156a, 156b disposed on upstream-side surfaces of the first vanes 152. Turbulent flow of the air-dissolved water is enhanced by the air-dissolved water colliding with the first upstream-side protrusions 156a, 156b. Especially between the first upstream-side protrusion 156a and the first upstream-side protrusion 156b in each pair, a vortex flow is generated. Due to this, the air-dissolved water flowing along the respective first vanes 152 collides, as a result of which the fine bubbles in the air-dissolved water are refined into finer bubbles, and the volume of the fine bubbles further increases. Then, the air-dissolved water flows out past the first outlet ends 160a of the first vanes 152. Since the first upstream-side protrusions 156a, 156b are each constituted of the half column portion 162 and the narrowing portion 164, the turbulent flow can be enhanced as compared to a configuration in which the first upstream-side protrusions 156a, 156b are not disposed on the first vanes 152. Further, for example, as compared to a configuration in which the first upstream-side protrusions 156a, 156b are each in a round columnar shape, a pressure loss can be reduced. Due to this, the pressure loss can be reduced while enhancing the turbulent flow.

As shown in FIG. 12, a part of the air-dissolved water that flows past the first outlet end 160a of each first vane 152 collides with the first downstream-side protrusions 158a, 158b on the downstream-side surface of another first vane 152 positioned adjacent to the each first vane 152 in the counterclockwise direction. For example, a part of the air-dissolved water that flows past the first outlet end 160a of the first vane 152a collides with the first downstream-side protrusions 158a, 158b on the downstream-side surface of the first vane 152e positioned adjacent to the first vane 152a in the counterclockwise direction. Due to the air-dissolved water colliding with the first downstream-side protrusions 158a, 158b, the turbulent flow of the air-dissolved water is further enhanced. Due to this, the air-dissolved water flowing along the respective first vanes 152 can easily collide, as a result of which the fine bubbles in the air-dissolved water are refined into finer bubbles, and the volume of the fine bubbles further increases. Then, the air-dissolved water flows into the second swirling flow generation portion 142. In the present embodiment, when the fine bubble generator 46 is seen from the upstream side along the center axis A direction, the second inlet end 180b of each second vane 172 is positioned on the counterclockwise side than the first outlet end 160a of its corresponding first vane 152 is, and the second outlet end 180a of each second vane 172 is positioned on the clockwise side than the first outlet end 160a of its corresponding first vane 152 is. That is, when the fine bubble generator 46 is seen from the upstream side along the center axis A direction, the first vanes 152a to 152f do not completely overlap with the second vanes 172a to 172f. Due to this, majority of the air-dissolved water that flowed along the first vane 152a flows toward a vicinity of the second inlet end 180b of the second vane 172a. A part of the air-dissolved water that flowed along the first vane 152a flows further to the clockwise side of the second inlet end 180b of the second vane 172a.

Figure 13:
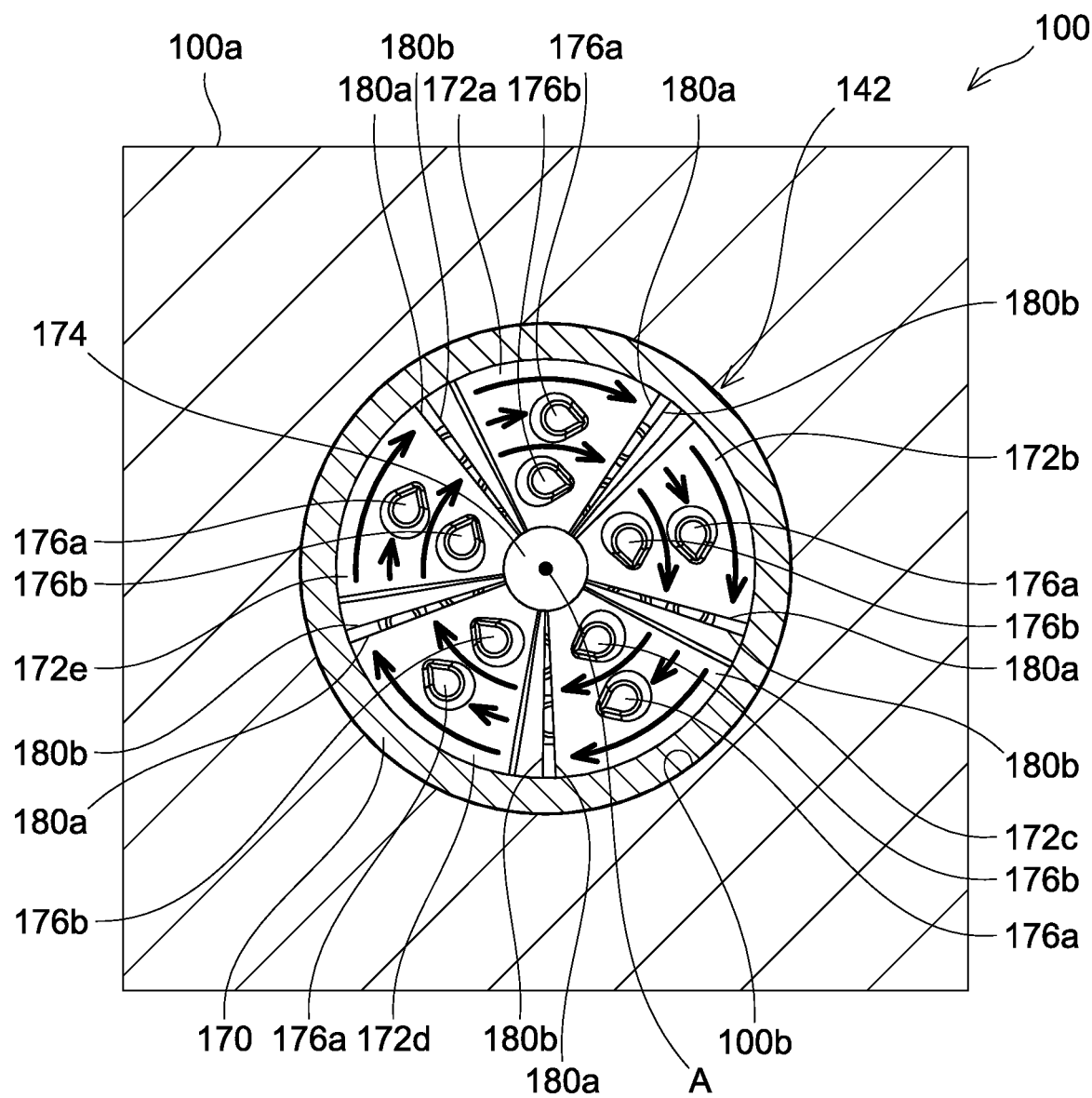
FIG. 13 is a cross-sectional view along a line XIII-XIII of FIG. 3.

As shown in FIG. 13, the air-dissolved water that flowed into the second swirling flow generation portion 142 flows along the second vanes 172 of the second swirling flow generation portion 142 and becomes a swirling flow that flows in the clockwise direction. Due to the air-dissolved water transitioning from the swirling flow that flows in the counterclockwise direction to the swirling flow that flows in the clockwise direction, the turbulent flow is thereby enhanced. Further, a part of the air-dissolved water flowing in the clockwise direction collides with the second upstream-side protrusions 176a, 176b disposed on the upstream-side surfaces of the second vanes 172. Due to the air-dissolved water colliding with the second upstream-side protrusions 176a, 176b as well, the turbulent flow of the air-dissolved water is enhanced. Especially between the second upstream-side protrusion 176a and the second upstream-side protrusion 176b in each pair, a vortex flow is generated. Then, the air-dissolved water flows out past the second outlet ends 180a of the second vanes 172.

As shown in FIG. 14, a part of the air-dissolved water that flowed out from the second outlet end 180a of each second vane 172 collides with the second downstream-side protrusions 178a, 178b on the downstream-side surface of another second vane 172 adjacent to the each second vane 172 in the clockwise direction. For example, a part of the air-dissolved water that flowed out past the second outlet end 180a of the second vane 172a collides with the second downstream-side protrusions 178a, 178b on the downstream-side surface of the second vane 172b positioned adjacent to the second vane 172a in the clockwise direction. Due to the air-dissolved water colliding with the second downstream-side protrusions 178a, 178b, the turbulent flow of the air-dissolved water is further enhanced. Due to this, the air-dissolved water that flowed along the respective second vanes 172 easily collides, as a result of which the fine bubbles in the air-dissolved water are refined into finer bubbles, and the volume of the fine bubbles further increases. Then, the air-dissolved water flows into the first swirling flow generation portion 140 of the cell unit 130 located downstream. For example, majority of the air-dissolved water that flowed along the second vane 172a flows to a vicinity of the first inlet end 160b of the first vane 152a. A part of the air-dissolved water that flowed along the second vane 172a flows further to the counterclockwise side of the first inlet end 160b of the first vane 152a.

As above, the air-dissolved water flows through a total of three cell units 130. Due to this, the fine bubbles in the air-dissolved water are refined, and the fine bubbles are generated in large volume.

According to the above configuration, as shown in FIGS. 2 to 14, the fine bubble generator 46 includes the inlet 102, the outlet 104, the first fine bubble generation portion 110 disposed between the inlet 102 and the outlet 104, and the second fine bubble generation portion 112 disposed between the first fine bubble generation portion 110 and the outlet 104. As shown in FIGS. 5 and 6, the first fine bubble generation portion 110 includes the diameter-reducing flow paths 122a to 122h and the diameter-increasing flow paths 124a to 124h. As shown in FIGS. 7 and 8, the second fine bubble generation portion 112 includes the first swirling flow generation portions 140 and the second swirling flow generation portions 142. As shown in FIGS. 7 and 8, the first swirling flow generation portions 140 each include the first cylindrical portion 150 and the plurality of first vanes 152 configured to generate the swirling flow flowing in the counterclockwise direction with respect to the center axis of the second fine bubble generation portion 112. The second swirling flow generation portions 142 each include the second cylindrical portion 170 and the plurality of second vanes 172 configured to generate the swirling flow flowing in the clockwise direction with respect to the center axis of the second fine bubble generation portion 112. As shown in FIG. 3, a flow speed of the air-dissolved water flowing into the first fine bubble generation portion 110 is increased by flowing through the diameter-reducing flow paths 122, and the pressure is reduced as the result. Due to this pressure reduction in the air-dissolved water, the bubbles are generated. Then, the pressure of the air-dissolved water is gradually increased by flowing through the diameter-increasing flow paths 124. When the pressure of the air-dissolved water is increased after the bubbles were generated by the pressure reduction, the bubbles included in the air-dissolved water break up into fine bubbles. Then, the air-dissolved water that flowed through the first fine bubble generation portion 110 flows into one of the first swirling flow generation portions 140 of the second fine bubble generation portion 112. The air-dissolved water that flowed into the first swirling flow generation portion 140 becomes the swirling flow flowing in the counterclockwise direction with respect to the center axis of the second fine bubble generation portion 112 by the plurality of first vanes 152. Then, the air-dissolved water that flowed out from the first swirling flow generation portion 140 flows into the corresponding second swirling flow generation portion 142. The air-dissolved water that flowed into the second swirling flow generation portion 142 becomes the swirling flow flowing in the clockwise direction, which is opposite to the counterclockwise direction, with respect to the center axis of the second fine bubble generation portion 112 by the plurality of second vanes 172. Due to the air-dissolved water transitioning from the swirling flow flowing in the counterclockwise direction to the swirling flow flowing in the clockwise direction, the turbulent flow is enhanced. Due to the turbulent flow being enhanced, the air-dissolved water flowing along the respective second vanes 172 can easily collide. Due to this collision of the air-dissolved water, the fine bubbles in the air-dissolved water break up and are refined into finer bubbles, and the volume of the fine bubbles increases. Due to this, even finer bubbles can be generated, and the volume of the fine bubbles can be increased. Thus, the fine bubbles can be generated in large volume.

Further, as shown in FIG. 12, when the second fine bubble generation portion 112 is seen along a center axial direction of the second fine bubble generation portion 112, each of the first vanes 152a to 152e constitute a pair with its corresponding one of the second vanes 172a to 172e, the second inlet end 180b on the counterclockwise side of the corresponding second vane 172a is located more on the counterclockwise side than the first outlet end 160a of the first vane 152a on the counterclockwise side is, and the second outlet end 180a of the second vane 172a is located more on the clockwise side than the first outlet end 160a of the first vane 152a is. That is, the second inlet end 180b of each second vane 172 on the counterclockwise side is located on the counterclockwise side than the first outlet end 160a of the corresponding first vane 152, and the second outlet end 180a of each second vane 172 on the clockwise side is located on the clockwise side than the first outlet end 160a of the corresponding first vane 152 is. According to the above configuration, majority of the air-dissolved water that flows into the second swirling flow generation portion 142 easily flows toward vicinities of the second inlet ends 180b of the second vanes 172 on the counterclockwise side. Due to this, in each second swirling flow generation portion 142, majority of the air-dissolved water becomes the swirling flow flowing in the clockwise direction, and as the result the turbulent flow is further enhanced. Thus, the air-dissolved water flowing along the second vanes 172 can more easily collide with each other. As the result, the fine bubbles can be generated in larger volume.

Further, as shown in FIG. 7, the first upstream-side protrusions 156a, 156b and the second upstream-side protrusions 176a, 176b protruding upstream are respectively disposed on the upstream-side surfaces of the first vanes 152 and the second vanes 172. According to the above configuration, the air-dissolved water flowing in the counterclockwise direction along the first vanes 152 of each first swirling flow generation portion 140 collides with the first upstream-side protrusions 156a, 156b, and the turbulent flow of the air-dissolved water is enhanced. Due to this, the air-dissolved water flowing along the first vanes 152 can easily collide with each other. Further, the air-dissolved water flowing in the clockwise direction along the second vanes 172 of each second swirling flow generation portion 142 collides with the second upstream-side protrusions 176a, 176b, and the turbulent flow of the air-dissolved water flowing in the clockwise direction is enhanced. Due to this, the air-dissolved water flowing along the second vanes 172 can more easily collide with each other. Thus, the fine bubbles can be generated in larger volume.

Further, as shown in FIG. 8, the first downstream-side protrusions 158a, 158b and the second downstream-side protrusions 178a, 178b protruding downstream are respectively disposed on the downstream-side surfaces of the first vanes 152 and the second vanes 172. According to the above configuration, the air-dissolved water that flowed out past each first vane 152 of each first swirling flow generation portion 140 collides with the first downstream-side protrusions 158a, 158b on the downstream-side surface of another first vane 152 adjacent to that first vane 152 in the counterclockwise direction, and the turbulent flow of the air-dissolved water is thereby enhanced. Due to this, the air-dissolved water that flowed out past the first vanes 152 can easily collide with each other. Further, the air-dissolved water that flowed out past each second vane 172 of each second swirling flow generation portion 142 collides with the second downstream-side protrusions 178a, 178b on the downstream-side surface of another second vane 172 adjacent to that second vane 172 in the clockwise direction, and the turbulent flow of the air-dissolved water is thereby enhanced. Due to this, the air-dissolved water that flowed out from between the respective second vanes 172 can easily collide with each other. Thus, the fine bubbles can be generated in larger volume.

Further, as shown in FIGS. 7 and 8, the first upstream-side protrusions 156a, 156b and the second upstream-side protrusions 176a, 176b protruding upstream are respectively disposed on the upstream-side surfaces of the first vanes 152 and the second vanes 172, and the first downstream-side protrusions 158a, 158b and the second downstream-side protrusions 178a, 178b protruding downstream are respectively disposed on the downstream-side surfaces of the first vanes 152 and the second vanes 172. As shown in FIG. 9, the distances between the center axis of the first fine bubble generation portion 112 and the first upstream-side protrusions 156a, 156b are different from the distances between this center axis and the first downstream-side protrusions 158a, 158b. According to the above configuration, in each first swirling flow generation portion 140, the air-dissolved water that flowed out from each first vane 152 without colliding with the first upstream-side protrusions 156a, 156b can be caused to collide with the first downstream-side protrusions 158a, 158b on the downstream-side surface of another first vane 152 adjacent to that first vane 152 in the counterclockwise direction. Further, as shown in FIG. 10, the distances between the center axis of the second fine bubble generation portion 112 and the second upstream-side protrusions 176a, 176b are different from the distances between this center axis and the second downstream-side protrusions 178a, 178b. According to the above configuration, in each second swirling flow generation portion 142, the air-dissolved water that flowed out from each second vane 172 without colliding with the second upstream-side protrusions 176a, 176b can be caused to collide with the second downstream-side protrusions 178a, 178b on the downstream-side surface of another second vane 172 adjacent to that second vane 172 in the clockwise direction. That is, likelihood of the air-dissolved water colliding with at least one of the first upstream-side protrusions 156a, 156b and the first downstream-side protrusions 158a, 158b in each first swirling flow generation portion 140 can be increased, and likelihood of the air-dissolved water colliding with at least one of the second upstream-side protrusions 176a, 176b and the second downstream-side protrusions 178a, 178b in each second swirling flow generation portion 142 can also be increased. Thus, the turbulent flow of the air-dissolved water can be enhanced, and the fine bubbles can be generated in larger volume.

(Corresponding Relationship)

The air-dissolved water is an example of "gas-dissolved water". The first cylindrical portions 150 and the second cylindrical portions 170 are respectively examples of "first outer peripheral portion" and "second outer peripheral portion". The counterclockwise direction and the clockwise direction are respectively an example of "first swirling direction" and "second swirling direction". The second inlet ends 180b of the second vanes 172, the second outlet ends 180a of the second vanes 172, and the first outlet ends 160a of the first vanes 152 are respectively examples of "end of each of the second vanes on a first swirling direction side", "end of each of the second vanes on a second swirling direction side", and "end of each of the first vanes on the first swirling direction side". The first upstream-side protrusions 156a, 156b and the second upstream-side protrusions 176a, 176b are examples of "upstream-side protrusions". The first downstream-side protrusions 158a, 158b and the second downstream-side protrusions 178a, 178b are examples of "downstream-side protrusions".

Specific examples of the present disclosure have been described in detail, however, these are mere exemplary indications and thus do not limit the scope of the claims. The art described in the claims includes modifications and variations of the specific examples presented above.

(First Variant) The position where the fine bubble generator 46 is disposed is not limited to the first hot water supply passage 32a. The fine bubble generator 46 may be disposed on the water supply passage 30, the bathtub-filling passage 50, the reheating passage 60, the first bathtub circulation passage 62, and/or the second bathtub circulation passage 68.

(Second Variant) In the above hot water supply system 2, the fine bubbles are generated using the air contained in the water supplied from the water source 4 such as the public tap water system. In a variant, the hot water supply system 2 may include an air-dissolved water generation device that dissolves air taken in from outside into water. Further, the air-dissolved water generated by the air-dissolved water generation device may be supplied to the fine bubble generator 46. Further, in another variant, an air introduction passage for introducing air from outside may be disposed at a connection between the diameter-reducing flow paths 122a to 122f and the diameter-increasing flow paths 124a to 124f of the first fine bubble generation portion 110. Further, gases such as carbon dioxide, hydrogen, and/or oxygen may be dissolved in water instead of the air.

(Third Variant) The first vanes 152 may be tilted down toward the downstream side along the clockwise direction, and the second vanes 172 may be tilted down toward the downstream side along the counterclockwise direction. That is, the air-dissolved water flowing along the first vanes 152 may flow in the clockwise direction, and the air-dissolved water flowing along the second vanes 172 may flow in the counterclockwise direction.

(Fourth Variant) The number of the cell units 130 which the fine bubble generator 46 includes may be one, two, or four or more.

(Fifth Variant) The second fine bubble generation portion 112 may be constituted of two first swirling flow generation portions 140 and one second swirling flow generation portion 142. In the present variant, the two first swirling flow generation portions 140 and the one second swirling flow generation portion 142 are disposed in the order of the first swirling flow generation portion 140, the second swirling flow generation portion 142, and the first swirling flow generation portion 140 from upstream to downstream. In general terms, the number of the first swirling flow generation portion 140 and the number of the second swirling flow generation portion 142 may differ from each other.

(Sixth Variant) When the fine bubble generator 46 is seen along the center axis A direction, the first outlet ends 160a of the first vanes 152 may overlap with the second inlet ends 180b of the second vanes 172, and the first inlet ends 160b of the first vanes 152 may overlap with the second outlet ends 180a of the second vanes 172. That is, the first vanes 152 and the second vanes 172 may completely be overlapped when the fine bubble generator 46 is seen along the center axis A direction.

(Sixth Variant) The first vanes 152 may not include the first upstream-side protrusions 156a, 156b and the first downstream-side protrusions 158a, 158b, and the second vanes 172 may not include the second upstream-side protrusions 176a, 176b and the second downstream-side protrusions 178a, 178b. Further, in another variant, the first vanes 152 may not include either the first upstream-side protrusions 156a, 156b or the first downstream-side protrusions 158a, 158b, and the second vanes 172 may not include either the second upstream-side protrusions 176a, 176b or the second downstream-side protrusions 178a, 178b.

(Seventh Variant) The numbers of the first upstream-side protrusions 156a, 156b, the first downstream-side protrusions 158a, 158b, the second upstream-side protrusions 176a, 176b, and the second downstream-side protrusions 178a, 178b may each be one, or three or more.

(Eighth Variant) The distances between the center axis A and the first upstream-side protrusions 156a, 156b may be same as the distances between the center axis A and the first downstream-side protrusions 158a, 158b. Further, the distances between the center axis A and the second upstream-side protrusions 176a, 176b may be same as the distances between the center axis A and the second downstream-side protrusions 178a, 178b.

(Ninth Variant) The cross-sectional shapes of the first upstream-side protrusions 156a, 156b, the first downstream-side protrusions 158a, 158b, the second upstream-side protrusions 176a, 176b, and the second downstream-side protrusions 178a, 178b when the fine bubble generator 46 is seen from the upstream side along the center axis A direction may be circular, sectoral, or triangular.

(Tenth Variant) The "first outer peripheral portion" and the "second outer peripheral portion" are respectively not limited to the first cylindrical portion 150 and the second cylindrical portion 170, and each may be any member having a cylindrical shape extending along the center axis A.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A fine bubble generator comprising:
an inlet into which gas-dissolved water in which gas is dissolved flows;
an outlet out of which the gas-dissolved water flows;
a first fine bubble generation portion disposed between the inlet and the outlet; and
a second fine bubble generation portion disposed between the first fine bubble generation portion and the outlet,
wherein the first fine bubble generation portion comprises:
a diameter-reducing flow path, wherein a flow path diameter of the diameter- reducing flow path reduces from upstream to downstream, and
a diameter-increasing flow path disposed downstream of the diameter reducing flow path, wherein the flow path diameter of the diameter-increasing flow path increases from upstream to downstream,
the second fine bubble generation portion comprises:
a first swirling flow generation portion; and
a second swirling flow generation portion disposed downstream of the first swirling flow generation portion,
wherein the first swirling flow generation portion comprises:
a first outer peripheral portion; and
a plurality of first vanes disposed inside the first outer peripheral portion and configured to generate a first swirling flow flowing in a first swirling direction with respect to a center axis of the second fine bubble generation portion, wherein each of the plurality of first vanes has a first upstream-side protrusion protruding to an upstream side or a first downstream-side protrusion protruding to a downstream side or a combination thereof, wherein the first upstream- side protrusion is disposed on an upstream-side surface of the first vane, and wherein the first downstream-side protrusion is disposed on a downstream-side surface of the first vane, and
wherein the second swirling flow generation portion comprises:
a second outer peripheral portion; and
a plurality of second vanes disposed inside the second outer peripheral portion and configured to generate a second swirling flow flowing in a second swirling direction opposite to the first swirling direction with respect to the center axis, wherein each of the plurality of second vanes has a second upstream-side protrusion protruding to the upstream side or a second downstream-side protrusion protruding to the downstream side or a combination thereof, wherein the second upstream-side protrusion is disposed on an upstream-side surface of the second vane, and wherein the second downstream-side protrusion is disposed on a downstream-side surface of the second vane.

2. The fine bubble generator according to claim 1, wherein when the second fine bubble generation portion is seen along the center axis,
   each of the first vanes constitutes a pair with its corresponding one of the second vanes,
   an end of the corresponding second vane on a first swirling direction side is located more on the first swirling direction side than an end of the first vane on the first swirling direction side is, and
   an end of the corresponding second vane on a second swirling direction side is located more on the second swirling direction side than the first swirling direction-side end of the first vane is.

3. The fine bubble generator according to claim 1, wherein each of the plurality of first vanes has the first upstream-side protrusion, and
   each of the plurality of second vanes has the second upstream-side protrusion.

4. The fine bubble generator according to claim 1, wherein each of the plurality of first vanes has the first downstream-side protrusion, and
   each of the plurality of second vanes has the second downstream-side protrusion.

5. The fine bubble generator according to claim 1, wherein each of the plurality of first vanes has the first upstream-side protrusion and the first downstream-side protrusion, and
   each of the plurality of second vanes has the second upstream-side protrusion and the second downstream-side protrusion.

6. A fine bubble generator comprising:
   an inlet into which gas-dissolved water in which gas is dissolved flows;
   an outlet out of which the gas-dissolved water flows;
   a first fine bubble generation portion disposed between the inlet and the outlet; and
   a second fine bubble generation portion disposed between the first fine bubble generation portion and the outlet,
   wherein the first fine bubble generation portion comprises:
      a diameter-reducing flow path, wherein a flow path diameter of the diameter- reducing flow path reduces from upstream to downstream, and
      a diameter-increasing flow path disposed downstream of the diameter reducing flow path, wherein the flow path diameter of the diameter-increasing flow path increases from upstream to downstream,
   the second fine bubble generation portion comprises:
      a first swirling flow generation portion; and
      a second swirling flow generation portion disposed downstream of the first swirling flow generation portion,
   the first swirling flow generation portion comprises:
      a first outer peripheral portion; and
      a plurality of first vanes disposed inside the first outer peripheral portion and configured to generate a first swirling flow flowing in a first swirling direction with respect to a center axis of the second fine bubble generation portion, and
   the second swirling flow generation portion comprises:
      a second outer peripheral portion; and
      a plurality of second vanes disposed inside the second outer peripheral portion and configured to generate a second swirling flow flowing in a second swirling direction opposite to the first swirling direction with respect to the center axis,
   wherein when the second fine bubble generation portion is seen along the center axis,
      each of the first vanes constitutes a pair with its corresponding one of the second vanes,
      an end of the corresponding second vane on a first swirling direction side is located more on the first swirling direction side than an end of the first vane on the first swirling direction side is, and
      an end of the corresponding second vane on a second swirling direction side is located more on the second swirling direction side than the first swirling direction side end of the first vane is,
   wherein each of upstream-side surfaces of the first vanes and upstream-side surfaces of the second vanes comprises an upstream-side protrusion protruding to an upstream side,
   each of downstream-side surfaces of the first vanes and downstream-side surfaces of the second vanes comprises a downstream-side protrusion protruding to a downstream side, and
   a distance between the center axis and each of the upstream-side protrusions is different from a distance between the center axis and each of the downstream-side protrusions.

7. The fine bubble generator according to claim 3, wherein when the second fine bubble generation portion is seen along the center axis,
   each of the first vanes constitutes a pair with its corresponding one of the second vanes,
   an end of the corresponding second vane on a first swirling direction side is located more on the first swirling direction side than an end of the first vane on the first swirling direction side is, and
   an end of the corresponding second vane on a second swirling direction side is located more on the second swirling direction side than the first swirling direction-side end of the first vane is.

8. The fine bubble generator according to claim 4, wherein when the second fine bubble generation portion is seen along the center axis,
   each of the first vanes constitutes a pair with its corresponding one of the second vanes,
   an end of the corresponding second vane on a first swirling direction side is located more on the first swirling direction side than an end of the first vane on the first swirling direction side is, and
   an end of the corresponding second vane on a second swirling direction side is located more on the second swirling direction side than the first swirling direction-side end of the first vane is.

9. The fine bubble generator according to claim 5, wherein
   a distance between the center axis and each of the protrusions on the upstream surfaces is different from a distance between the center axis and each of protrusions on the downstream surfaces.

10. The fine bubble generator according to claim 5, wherein when the second fine bubble generation portion is seen along the center axis,
   each of the first vanes constitutes a pair with its corresponding one of the second vanes, an end of the corresponding second vane on a first swirling direction side is located more on the first swirling direction side than an end of the first vane on the first swirling direction side is, and an end of the corresponding second vane on a second swirling direction side is located more on the second swirling direction side than the first swirling direction-side end of the first vane is.

* * * * *